[54] BINUCLEAR N-HETEROCYCLIC N,N-DIGLYCIDYL COMPOUNDS, PROCESSES FOR THEIR MANUFACTURE AND THEIR USE

[75] Inventors: Juergen Habermeier, Allschwil; Dieter Baumann, Birsfelden; Daniel Porret, Binningen; Hans Batzer, Arlesheim, all of Switzerland

[73] Assignee: Ciba-Geigy AG, Basle, Switzerland

[22] Filed: Dec. 15, 1972

[21] Appl. No.: 315,396

Related U.S. Application Data

[63] Continuation-in-part of Ser. No. 144,407, May 17, 1971, abandoned.

[30] Foreign Application Priority Data
May 22, 1970 Switzerland.................. 7627/70

[52] U.S. Cl..... 260/309.5, 117/124 E, 117/161 ZB, 161/185, 161/186, 260/2 EP, 260/2 EA, 260/2 EC, 260/18 EP, 260/30.4 EP, 260/30.6 R, 260/31.8 E, 260/37 EP, 260/47 EP, 260/59, 260/77.5 R, 260/78.4 EP, 260/80 P, 260/256.4 C, 260/830 R, 260/830 P, 260/830 S, 260/830 TN, 260/831, 260/834
[51] Int. Cl.......................................... C07d 49/32
[58] Field of Search.................. 260/309.5, 256.4 C

[56] References Cited
UNITED STATES PATENTS
| | | | |
|---|---|---|---|
| 3,391,097 | 7/1968 | Williamson | 260/309.5 |
| 3,542,803 | 11/1970 | Porret | 260/309.5 |
| 3,629,263 | 12/1971 | Batzer et al. | 260/309.5 |
| 3,640,910 | 2/1972 | Porret et al. | 260/309.5 |

FOREIGN PATENTS OR APPLICATIONS
| | | | |
|---|---|---|---|
| 2,125,355 | 12/1971 | Germany | 260/309.5 |

*Primary Examiner*—Natalie Trousof
*Attorney, Agent, or Firm*—Vincent J. Cavalieri

[57] ABSTRACT

Binuclear N-heterocyclic N,N'-diglycidyl compounds of the formula

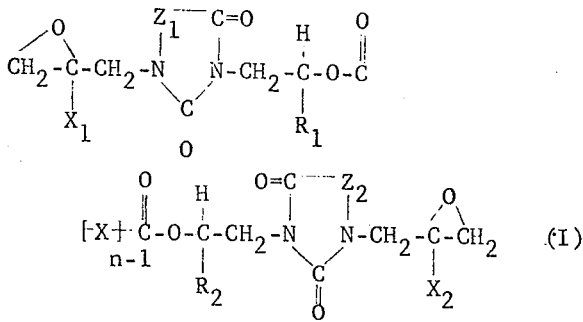

wherein $X_1$ and $X_2$ each denotes a hydrogen atom or a methyl group, $R_1$ and $R_2$ each represents a hydrogen atom, a methyl group, an ethyl group or a phenyl group, X represents an aliphatic hydrocarbon radical having 1 to 14 carbon atoms, a cycloaliphatic hydrocarbon radical having 5 or 6 carbon atoms, an araliphatic hydrocarbon radical having 7 to 14 carbon atoms or an aromatic hydrocarbon radical having 6 to 14 carbon atoms, $Z_1$ and $Z_2$ are radicals of the formulae

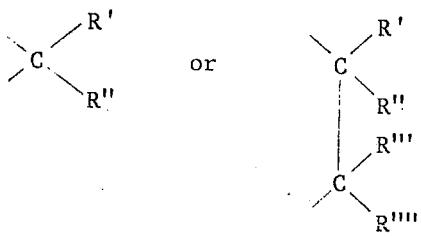

wherein R', R'', R''' and R'''' independently of one another each denotes a hydrogen atom or an alkyl radical having 1 to 4 carbon atoms or R' and R'' represent together a pentamethylene radical, and $n$ denotes the number 1 or 2.

These compounds are resins which are viscous to solid at room temperature, and which can be converted with curing agents to products having good mechanical and electrical properties.

7 Claims, No Drawings

BINUCLEAR N-HETEROCYCLIC N,N-DIGLYCIDYL COMPOUNDS, PROCESSES FOR THEIR MANUFACTURE AND THEIR USE

This application is a continuation-in-part application of our copending application Ser. NO. 144,407, filed May 17, 1971 now abandoned.

The subject of the present invention are new, binuclear N-heterocyclic N,N'-diglycidyl compounds of the formula

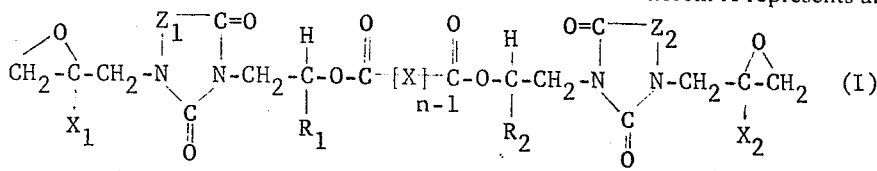

wherein $X_1$ and $X_2$ each denote a hydrogen atom or a methyl group, $R_1$ and $R_2$ each represent a hydrogen atom, a methyl group, an ethyl group or a phenyl group, $Z_1$ and $Z_2$ independently of one another each denote a nitrogen-free divalent radical which is required to complete a five-membered or six-membered, unsubstituted or substituted heterocyclic ring, X represents the hydrocarbon radical of a dicarboxylic acid obtained by removing the carboxyl groups, and $n$ denotes the number 1 or 2.

The radicals Z and $Z_1$ in the formula (I) preferably consist only of carbon and hydrogen, or of carbon, hydrogen and oxygen. They can, for example, be radicals of the formulae

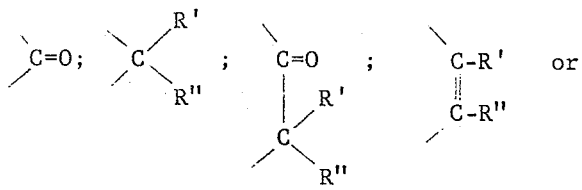

wherein R', R'', R''' and R'''' independently of one another each can denote a hydrogen atom or, for example, an alkyl radical, an alkenyl radical, a cycloalkyl radical or an optionally substituted phenyl radical.

Especially, the present invention relates to a compound of the formula (I), wherein $X_1$ and $X_2$ each denotes a hydrogen atom or a methyl group, $R_1$ and $R_2$ represents a hydrogen atom, a methyl group, an ethyl group or a phenyl group, X represents an aliphatic hydrocarbon radical having 1 to 14 carbon atoms, a cycloaliphatic hydrocarbon radical having 5 to 6 carbon atoms, an araliphatic hydrocarbon radical having 7 to 14 carbon atoms or an aromatic hydrocarbon radical having 6 to 14 carbon atoms, $Z_1$ and $Z_2$ are radicals of the formulae

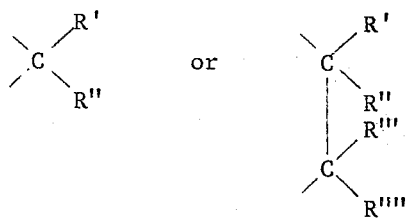

wherein R', R'', R''' and R'''' independently of one another each denotes a hydrogen atom or an alkyl radical having 1 to 4 carbon atoms or R' represent together a pentamethylene radical, and $n$ denotes the number 1 or 2.

Preferred is a compound of formula (I), wherein $X_1$ is identical with $X_2$, $R_1$ is identical with $R_2$, and $Z_1$ is identical with $Z_2$, and a compound of formula (I), wherein X represents an aliphatic hydrocarbon radical having 2 to 8 carbon atoms, a cyclohexylene radical or a phenylene radical.

The new N,N'-diglycidyl compounds of the formula (I) are, as a rule, resins which are viscous to solid room temperature, and which can be converted with customary curing agents for epoxide resins, such as dicarboxylic anhydrides or polyamines, either as they are or mixed with reactive diluents, to give mouldings having good mechanical and electrical properties.

This is an unexpected effect in view of the similar products described in the U.S. Pat. Nos. 3,542,803, 3,629,263 and 3,640,910 (see also the comparison tests under the Examples III and VI), since the mechanical properties, especially the impact strength of the

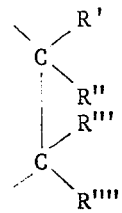

products described in the above cited patent specifications are lower than those of the cured products according to the present invention.

The products described in the U.S. Pat. No. 3,391,097 are modified by unsaturated fatty acids, whereby the epoxide groups are destroyed by the addition reaction of the carbon acids. The products are cured by acting of air on the olefinic groups in the compounds. These compounds are therefore quite different from those defined herein and would not render the products according to the present invention obvious to an expert.

The new diepoxides of the formula (I) are manufactured according to methods which are in themselves known. A preferred process according to the invention for their manufacture is characterised in that, in a compound of the formula

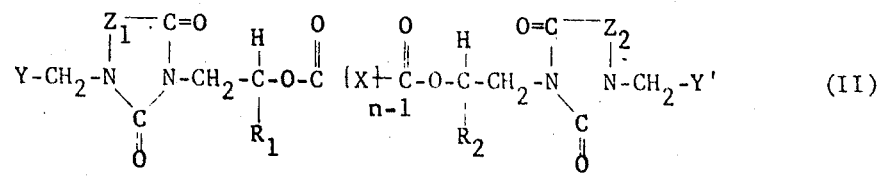

(II)

wherein $R_1$, $R_2$, $Z_1$, $Z$, $X$, and $n$ have the same meaning as in the formula (I) and the radicals Y and Y' are radicals which can be converted into 1,2-epoxyethyl radicals or 1-methyl-1,2-epoxyethyl radicals, Y and Y' are converted into epoxyethyl or 1-methyl-1,2-epoxyethyl radicals.

A radical Y or Y' which can be converted into the 1,2-epoxyethyl radical or 1-methyl-1,2-epoxyethyl radical is above all a hydroxyhalogenoethyl radical which carries the functional groups on different carbon atoms, especially a 2-halogeno-1-hydroxyethyl radical or a 2-halogeno-1-hydroxy-1-methylethyl radical. Halogen atoms are here especially chlorine or bromine atoms. The reaction takes place in the usual manner, above all in the presence of agents which split off hydrogen halide, such as strong alkalis, for example anhydrous sodium hydroxide or aqueous sodium hydroxide solution. It is, however, also possible to employ other strongly alkaline reagents, such as potassium hydroxide, barium hydroxide, calcium hydroxide, sodium carbonate or potassium carbonate.

A further radical Y or Y' which can be converted to the 1,2-epoxyethyl radical is, for example, the ethenyl radical, which can be converted into the 1,2-epoxyethyl radical in a known manner, such as, above all, by reaction with hydrogen peroxide or per-acids, for example peracetic acid, perbenzoic acid or monoperphthalic acid.

The starting substances of the formula (II) are obtained in a manner which is in itself known. Thus it is, for example, possible to react a diester of the formula

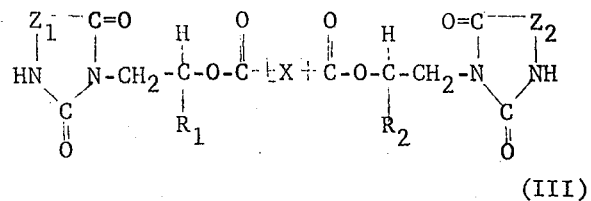

(III)

wherein $R_1$, $R_2$, $Z_1$, $Z_2$, X and n have the abovementioned meaning, with a compound of the formula Y—CH$_2$—Hal, wherein Hal represents a halogen atom and Y has the abovementioned meaning. Preferably, the compound of the formula (III) is reacted with an epihalogenohydrin or β-methylepihalogenohydrin, above all epichlorohydrin or β-methylepichlorohydrin, in the presence of a catalyst, such as, especially, a tertiary amine, a quaternary ammonium base or a quaternary ammonium salt. Suitable catalysts for the addition of epichlorohydrin or β-methylepichlorohydrin are above all tertiary amines, such as triethylamine, tri-n-propylamine, benzyldimethylamine, N,N-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; hydrazines having a tertiary nitrogen atom, such as 1,1-dimethylhydrazine, which can also be employed in the quaternised form; alkali halides, such as lithium chloride, potassium chloride, sodium chloride, sodium bromide or sodium fluoride; also, ion exchange resins having tertiary or quaternary amino groups, as well as ion exchangers having acid amide groups. Basic impurities, which can occur in technical commercially available forms of the starting compounds, can also act as catalysts. In such cases it is not necessary to add a special catalyst.

The manufacture of the intermediate products of the formula (II) and of the end products of the formula (III) is appropriately carried out in a single two-stage process, without isolation of the intermediate products (II).

A preferred embodiment of the process therefore consists, for example, or reacting an epihalogenohydrin or β-methyl-epihalogenohydrin, preferably epichlorohydrin or β-methylepichlorohydrin, with a diester of the formula (III) in the presence of a catalyst, such as, preferably, a tertiary amine, a quaternary ammonium base or a quaternary ammonium salt, and in a second stage treating the resulting product containing halogenohydrin groups with agents which split off hydrogen halide. In these reactions, the procedure described above is followed, and it is possible to use the abovementioned compounds as catalysts for the addition of epihalogenohydrin or β-methylepihalogenohydrin and/or for the dehydrohalogenation. Particularly good yields are obtained if an excess of epichlorohydrin or β-methylepichlorohydrin is used. A partial epoxidisation of dichlorohydrin or of the dichloro-β-methylhydrin of the diester (III) already occurs during the first reaction, before the addition of alkali. The epichlorohydrin or the β-methylepichlorohydrin, which act as hydrogen chloride acceptors, have then been partially converted into glyceroldichlorohydrin or into β-methylglycerol-dichlorohydrin.

The symmetrical diesters of the formula (III) can be manufactured according to known methods, by esterification of 1 mol of dicarboxylic acid of the formula

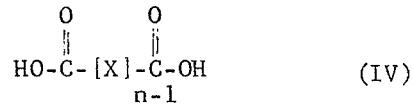

with 2 mols of a N-heterocyclic monoalcohol of the formula

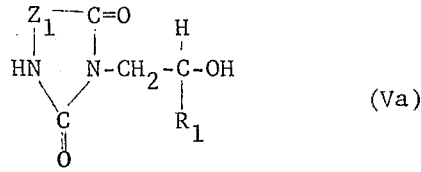

or of the formula

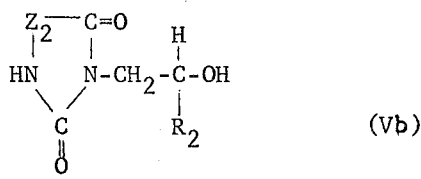

Diesters of the formula (III) which are of unsymmetrical structure can, for example, be obtained by first partially esterifying 1 mol of a dicarboxylic acid (IV) with 1 mol of a monoalcohol of the formula (Va) and in a second stage manufacturing the diester with 1 mol of monoalcohol (Vb) which is different from the monoalcohol (Va).

Possible dicarboxylic acids of the formula (IV) are those of the aliphatic, cycloaliphatic, araliphatic and aromatic series. The following may be mentioned: oxalic acid, malonic acid, succinic acid, glutaric acid, adipic acid, pimelic acid, suberic acid, azelaic acid, sebacic acid, nonanedicarboxylic acid, decanedicarboxylic acid, undecanedicarboxylic acid, dodecanedicarboxylic acid, allylsuccinic acid, dodecylsuccinic acid, dodecenylsuccinic acid, Δ⁴-tetra hydrophthalic acid, hexahydrophthalic acid, 4-methylhexahydrophthalic acid, 3,6-endomethylene-Δ⁴-tetrahydrophthalic acid, methyl-3,6-endomethylene-Δ⁴-tetrahydrophthalic acid, 3,4,5,6,7,7-hexachloro-3,6-endomethylene-Δ⁴-tetrahydrophthalic acid, diphenic acid, phenylenediacetic acid, hydroquinone-0,0'-diacetic acid, diomethane-0,0'-diacetic acid, phthalic acid, isophthalic acid, terephthalic acid, tetrachlorophthalic acid and naphthalenedicarboxylic acid.

The monoalcohols of the formulae (V$a$) or (V$b$) are obtained in a manner which is in itself known, by reacting 1 mol of mononuclear N-heterocyclic compound of the general formula

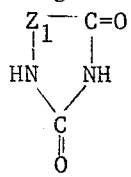 (VIa) or 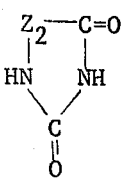 (VIb)

with 1 mol of monoepoxide of the formula

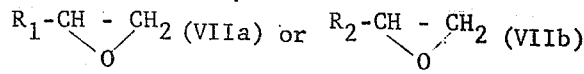

first, in the presence of a suitable catalyst, $Z_1$ or $Z_2$, and $R_1$ or $R_2$, having the same meaning as in the formula (I).

Suitable monoepoxides of the formulae (VII$a$) or (VIII$b$) are ethene oxide (ethylene oxide), propene oxide (propylene oxide), 1,2-butene oxide and styrene oxide.

Since the endocyclic —NH— group located between two carbonyl groups is more strongly acid, it reacts preferentially with the monoepoxide, so that if only a slight excess of the monoepoxide over the stoichiometric amount required to form a monoalcohol is employed, the monoalcohol of the formula (V$a$) or (V$b$) is produced practically quantitatively.

The addition of the monoepoxide to the more strongly acid NH-group of the N-heterocyclic compound can be effected in the presence of either acid or alkaline catalysts.

Preferably, however, alkaline catalysts, such as tetraethylammonium chloride or tertiary amines, are used in the manufacture of the monoalcohols. However, alkali halides, such as lithium chloride or sodium chloride, can also be employed successfully for this addition reaction; it also takes place without catalysts.

The mononuclear N-heterocyclic compounds of the formulae (VI$a$) or (VI$b$) used for the manufacture of the monoalcohols of the formulae (V$a$) or (V$b$) respectively are above all hydantoin, hydantoin derivatives, barbituric acid, barbituric acid derivatives, uracil, uracil derivatives, dehydrouracil and dihydrouracil derivatives, and also parabanic acid.

Hydantoin and its preferred derivatives correspond to the general formula

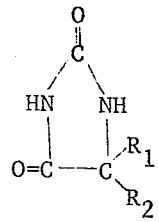 (VIII)

wherein $R_1$ and $R_2$ each denote a hydrogen atom or a lower alkyl radical with 1 to 4 carbon atoms, or wherein $R_1$ and $R_2$ together form a tetramethylene or pentamethylene radical. Hydantoin, 5-methyl-hydantoin, 5-methyl-5-ethylhydantoin, 5-n-propylhydantoin, 5-isopropyl-hydantoin, 1,3-diaza-spiro-(4.5)-decane-2,4-dione, 1,3-diaza-spiro(4.4)-nonane-2,4-dione and preferably 5,5-dimethyl-hydantoin may be mentioned.

Barbituric acid and its preferred derivatives correspond to the general formula

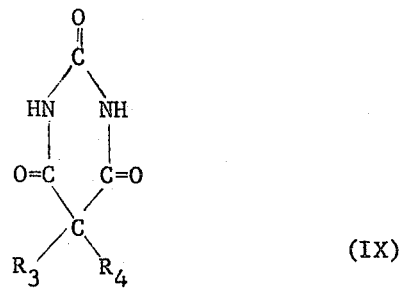 (IX)

wherein $R_3$ and $R_4$ independently of one another each denote a hydrogen atom, an alkyl radical, an alkenyl radical, a cycloalkyl or cycloalkenyl radical, or a substituted or unsubstituted phenyl radical.

The following may be mentioned: barbituric acid, 5-ethylbarbituric acid, 5,5-diethylbarbituric acid, 5-ethyl-5-butylbarbituric acid, 5-ethyl-5-sec.-butylbarbituric acid, 5-ethyl-5-isopentylbarbituric acid, 5,5-diallylbarbituric acid, 5-allyl-5-isopropylbarbituric acid, 5-allyl-5-sec.-butyl-barbituric acid, 5-ethyl-5(1'-methylbutyl)barbituric acid, 5-allyl-5(1'-methylbutyl)-barbituric acid, 5-ethyl-5-phenylbarbituric acid and 5-ethyl-5(1'-cyclohexen-1-yl)barbituric acid.

Uracil and its preferred derivatives correspond to the general formula

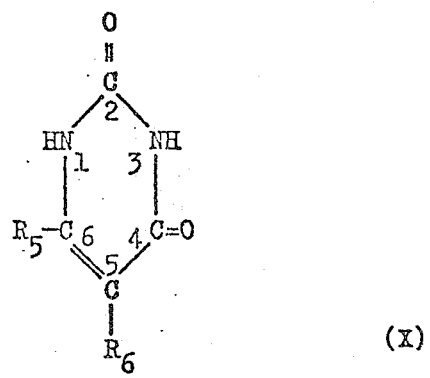 (X)

wherein $R_5$ and $R_6$ both denote hydrogen, or one of the two radicals denotes a hydrogen atom and the other radical denotes a methyl group.

Uracils of the formula (X) are uracil itself, and also 6-methyl-uracil and thymin (= 5-methyl-uracil).

Dihydrouracil (= 2,4-dioxo-hexahydropyrimidine) and its preferred derivatives correspond to the general formula:

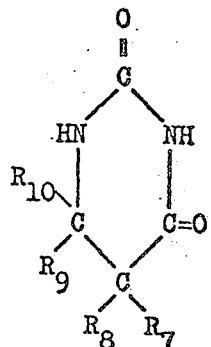 (XI)

wherein $R_7$ and $R_8$ both denote a hydrogen atom or identical or different alkyl radicals, preferably alkyl radicals with 1 to 4 carbon atoms, and $R_9$ and $R_{10}$ independently of one another each denote a hydrogen atom or an alkyl radical.

Preferably, the two radicals $R_7$ and $R_8$ in the above formula denote methyl groups, $R_9$ denotes a hydrogen atom or a lower alkyl radical with 1 to 4 carbon atoms, and $R_{10}$ denotes a hydrogen atom. The following may be mentioned: 5,6-dihydrouracil, 5,5-dimethyl-5,6-dihydrouracil (2,4-dioxo-5,5-dimethylhexahydropyrimidine) and 5,5-dimethyl-6-isopropyl-5,6-dihydrouracil (2,4-dioxo-5,5-dimethyl-6-isopropylhexahydropyrimidine).

The new N,N'-diglycidyl compounds of the formula (I), according to the invention, react with the customary curing agents for polyepoxide compounds and can therefore be cross-linked or cured by the addition of such curing agents, analogously to other polyfunctional epoxide compounds or epoxide resins. Basic or acid compounds can be used as such curing agents.

As suitable curing agents there may be mentioned, for example: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis(4-amino-3-methyl-cyclohexyl)methane, 3,5,5-trimethyl-3-(aminomethyl)cyclohexylamine ("isophoronediamine"), Mannich bases, such as 2,4,6-tris(dimethylaminomethyl)phenol; m-phenylenediamine, p-phenylenediamine, bis(4-aminophenyl)methane, bis(4-aminophenyl)sulphone, m-xyxylendeiamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine, in excess, and polyepoxides, such as diomethane-polyglycidyl ethers; ketimines, for example from acetone or methyl ethyl ketone and bis(p-aminophenyl)methane; adducts of monophenols or polyphenols and polyamines; polyamides, especially those from aliphatic polyamines, such as diethylenetriamine or triethylenetetramine and dimerised or trimerised unsaturated fatty acids, such as dimerised linseed oil fatty acid ("VERSAMID"); polymeric polysulphides ("THIOKOL"); dicyandiamide, aniline-formaldehyde resins; polyhydric phenols, for example resorcinol, 2,2-bis(4-hydroxyphenyl)propane or phenolformaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid, triphenylphosphite, polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

Cure accelerators can furthermore be employed in the curing reaction; when using polyamides, dicyandiamide, polymeric polysulphides or polycarboxylic anhydrides as curing agents, suitable accelerators are, for example, tertiary amines, their salts or quaternary ammonium compounds, for example 2,4,6-tris(dimethylaminomethyl)phenol, benzyldimethylamine, 2-ethyl-4-methyl-imidazole, 4-amino-pyridine, triamylammonium phenolate, and also alkali metal alcoholates, such as, for example, sodium hexanetriolate. Monophenols or polyphenols, such as phenol or diomethane, salicyclic acid or thiocyanates can, for example, be employed as accelerators when curing with amines.

The term "curing", as used here, denotes the conversion of the abovementioned diepoxides into insoluble and infusible, cross-linked products, and as a rule, in particular, with simultaneous shaping to give mouldings, such as castings, pressings or laminates and the like, or to give "sheet-like strucures", such as coatings, coverings, lacquer films or adhesive bonds.

Depending on the choice of the curing agent, the curing can be effected at room temperature (18°–24°C) or at elevated temperature (for example 50°–180°C).

The curing can, if desired, also be carried out in 2 stages, by first prematurely stopping the curing reaction, or carrying out the first stage at only a moderately elevated temperature, whereby a curable precondensate which is still fusible and soluble (a so-called "B-stage") is obtained from the epoxide component and the curing agent component. Such a precondensate can, for example, serve for the manufacture of "pre-pregs", compression moulding compositions or sintering powders.

The new N,N'-diglycidyl compounds can also be used as a mixture with other curable diepoxide or polyepoxide compounds. As such, the following may, for example, be mentioned: polyglycidyl ethers of polyhydric alcohols, such as 1,4-butanediol, $\Delta^3$-cyclohexenedimethanol, polyethylene glycols, polypropylene glycols, 1,3-di-(2'-hydroxy-n-propyl)-5,5-dimethylhydantoin or 2,2-bis-(4'-hydroxycyclohexyl)-propane; polyglycidyl ethers of polyhydric phenols, such as 2,2-bis-(4'-hydroxyphenyl)-propane (= diomethane), 2,2-bis-(4'-hydroxy-3',5'-dibromo-phenyl)-propane, bis-(4-hydroxyphenyl)-sulphone, 1,1,2,2-tetrakis(4-hydroxyphenyl)ethane or condensation products, manufactured in an acid medium of formaldehyde with phenols, such phenol novolacs or cresol novolacs; polyglycidyl esters of polycarboxylic acids, such as, for example, phthalic acid diglycidyl ester, isophthalic acid diglycidyl ester, tetrahydrophthalic acid diglycidyl ester or hexahydrophthalic acid diglycidyl ester; triglycidyl isocyanurate, N,N'-diglycidyl-5,5-dimethylhydantoin, 3-(2'-hydroxy-n-propyl)-5,5-dimethylhydantoin, aminopolyepoxides such as are obtained by dehydrohalogenation of the reaction products of epihalogenohydrin and primary or secondary amines, such as aniline or 4,4'-diaminodiphenylmethane: further, alicyclic compounds containing several epoxide groups, such as vinylcyclohexene diepoxide, dicyclopentadiene diepoxide, ethylene glycol-bis-(3,4-epoxytetrahydrodicyclopentadien-8-yl)-ether, (3,4-epoxycyclohexylmethyl)-3,4-epoxycyclohexanecarboxylate, (3'4'-epoxy-6'-methylcyclohexylmethyl)-3,4-epoxy-6-methylcyclohexanecarboxylate. bis-(2,3- epoxycyclopentyl)-ether or 3-(3',4'-epoxycyclohexyl)-2,4-dioxa-spiro-(5,5)-9,10-epoxyundecane. If desired, other known reactive diluents, such as, for example, styrene oxide, butyl-glycidyl-ether, diglycidyl-formal, isooctyl-glycidyl-ether, phenyl-glycidyl-ether, cresyl-glycidyl-ether, and glycidyl esters of synthetic, highly branched, mainly tertiary aliphatic monocarboxylic acids ("CARDURA E") can also be used conjointly.

A further subject of the present invention are therefore curable mistures which are suitable for the manufacture of mouldings, including sheet-like structures, and which contain the N,N'-diglycidyl compounds of the formula (I), according to the invention, optionally together with other diepoxide or polyepoxide compounds and also curing agents for epoxide resins, such as polyamines or polycarboxylic anhydrides.

The diepoxides according to the invention, or their mixtures with other polyepoxide compounds and/or curing agents, can furthermore be mixed, in any stage before curing, with customary modifiers, such as extenders, fillers and reinforcing agents, pigments, dystuffs, organic solvents, plasticisers, flow control agents, agents for conferring thixotropy, flame-proofing substances and mould release agents.

As extenders, reinforcing agents, fillers and pigments which can be employed in the curable mixtures according to the invention, there may, for example, be mentioned: coal tar, bitumen, textile fibres, glass fibres, asbestos fibres, boron fibres, carbon fibers, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("AEROSIL"), lithopones, barytes, titanium dioxide, carbon black, graphite, oxide pigments, such as iron oxide, or metal powders, such as aluminum powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

Examples of plasticisers which can be employed for modifying the curable mixtures are dibutyl phthalate, dioctyl phtalate and dinonyl phthalate, tricresyl phosphate, trixylenyl phosphate and polypropylene glycols.

Silicones, cellulose acetobutyrate, polyvinyl butyral, waxes, stearates and the like (which in part are also used as mould release agents) can, for example, be added as flow control agents for employing the curable mixtures, especially in surface protection.

Particularly for use in the lacquer field, the diepoxide compounds can further more be partially esterified in a known manner with carboxylic acids, such as, especially, higher unsaturated fatty acids. It is furthermore possible to add other curable synthetic resins, for example phenoplasts or aminoplasts, to such lacquer resin formulations.

The manufacture of the curable mixtures according to the invention can be effected in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be employed in a formulation adapted in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the Examples which follow, unless otherwise stated, parts denote parts by weight and percentages denote percentages by weight. The relationship of parts by volume to parts by weight is as of the millilitre to the gram.

To determine the mechanical and electrical properties of the curable mixtures described in the Examples which follow, sheets of 92 × 41 × 12 mm were manufactured for determining the flexural strength, deflection, impact strength and water absorption. The test specimens (60 × 10 × 4 mm) for determining the water absorption and for the flexural test and impact test (VSM 77,103 and VSM 77,105, respectively) were machined from the sheets.

Test specimens of sizes 120 × 15 × 10 mm were in each case cast for determining the heat distortion point according to Martens (DIN 53,458).

Sheets of sizes 120 × 120 × 4 mm were cast for testing the arcing resistance and the tracking resistance (VDE 0303).

MANUFACTURE OF THE STARTING SUBSTANCES.

A. Monoalcohols

1. Manufacture of 3-(2'-hydroxy-n-propy)-5,5-dimethylhydantoin.

a. 896 g of 5,5-dimethylhydantoin (7 mols) and 5.92 g of lithium chloride in 900 ml of dimethylformamide are stirred at 50°C. 458 g of propene oxide (7.7 mols) are added dropwise over the course of one hour, with gentle stirring. After the addition, the mixture is stirred for 3 hours at 55°C. The heating bath is then brought to 100°C. The reaction is slightly exothermic, and the contents of the flask rise to 112°C. After 1 hour, the exothermic effect has subsided and the reaction is hence complete. The solution is filtered. After having been cooled to room temperature, the batch is adjusted to pH = 7 with about 15 ml of 20% strength sulphuric acid. The dimethylformamide is recovered by distilling off under a waterpump vacuum, and the product is subsequently isolated by drying at 95°C under 0.1 mm Hg. 1305 g of an eggshell-coloured crystal mass (100% of theory) are obtained. The product can be purified by recrystallisation from acetone. A colourless, crystalline product of melting point 83°–84.5°C is obtained, in approximately 80% yield of pure material.

Elementary analysis shows the following:

| Found: | Calculated: |
| --- | --- |
| 14.93% N | 15.04% N |
| 7.59% H | 7.58% H |

The molecular weight is determined osmometrically to be M = 186. The mass spectrum also shows M = 186. The theoretical molecular weight is 186.21.

In addition to the absorptions known for dimethylhydantoin, the infrared spectrum above all shows the following bands: 3495 cm$^{-1}$ (S): O—H, 3250 cm$^{-1}$ (S): N—H.

The proton resonance spectrum (60 Mc H-NMR, recorded in CDCl₃ at 35°C, with tetramethylsilane as the internal standard) furthermore shows, through the presence of the following signals, that the structure given below applies to the new compound:

3 protons: = 1.17 and 1.17 and 1.28 (doublet): 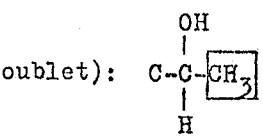

6 protons: = 1.50 (singlet): 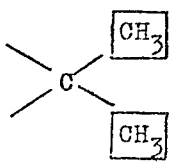

4 protons: = 3.55 and 3.65 (doublet): 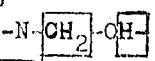

and = 4.0–4.2 (multiplet): 

1 proton: = 7.15 

Theoretical number of protons: 14
The structure is, accordingly

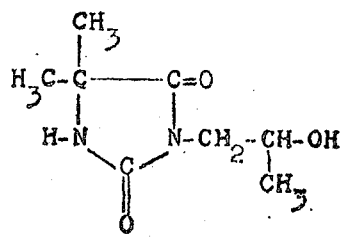

b. A mixture of 256 g. of 5,5-dimethylhydantoin, 159 g of potassium carbonate, 208 g of 1-chloro-2-hydroxypropane (propylene chlorohydrin) and 500 ml of dimethylformamide is stirred for 3 hours at 120°C. A vigorous stream of CO₂ is evolved. Thereafter the mixture is stirred for a further 3 hours at 130°C. The batch is cooled to room temperature, the inorganic material is filtered off, and the substance is isolated by distilling off the dimethylformamide under a waterpump vacuum. 240 g of a colourless crystal mass (corresponding to 65% of theory) are obtained.

The product can be purified by recrystallisation from acetone. Analyses and spectra show that the product is identical with the preparation manufactured according to instruction (A) (1) (a).

2. Manufacture of 3-(2'-hydroxyethyl)-5,5-dimethylhydantoin.

A solution of 529 g of ethylene oxide (12 mols) in 750 ml of dimethylformamide is added to a solution of 1281 g of 5,5-dimethylhydantoin (10 mols) and 20 g of lithium chloride in 1200 ml of dimethylformamide at 5°C. This mixture is warmed to 45°–50°C over the course of 1 hour, and stirred at about 50°C for 2 hours. Thereafter the temperature is further raised to 60°C for 10 hours. After completion of the reaction the mixture is treated and worked up as described under instruction (A) (1) (a). 1688 g of a white crystal mass (corresponding to 98.0% of theory) are obtained.

The product can be purified by recrystallisation from acetone. The purified substance melts at 70°–72°C.
Elementary analysis shows the following:

Found: 48.4% C 7.0% H 16.1% N
Calculated: 48.8% C 7.0% H 16.3% N

The infrared spectrum shows the OH absorption at 3390 cm⁻¹, the N—H group absorbs at 3200 cm⁻¹, and further important bands are to be found at 1695 and 1770 cm⁻¹ (carbonyl) and at 1047 and 1059 cm⁻¹.

The proton-magnetic resonance spectrum also shows, through the agreement of the integration with the number of protons theoretically present, that the substance has the formula given below:

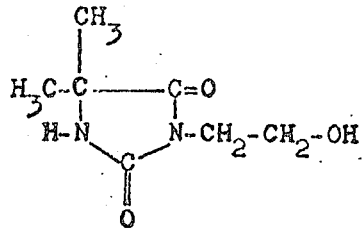

3. Manufacture of 3-(2'-hydroxy-n-butyl)-5,5-dimethylhydantoin.

256.3 g of 5,5-dimethylhydantoin (2 mols) and 2.54 g of lithium chloride in 300 ml of dimethylformamide are stirred at 65°C. 158.8 g of 1,2-butene oxide (2.2 mols) are slowly added dropwise at this temperature, over the course of 2 hours. Thereafter the mixture is stirred for a further 4 hours at 100°C. The solution is cooled to room temperature and filtered, and the filtrate is then concentrated at 70°C/20 mm Hg on a rotary evaporator and dried to constant weight at 90°C/0.1 mm Hg. A crystalline, light yellow crude product is obtained in quantitative yield (400.1 g). The substance can be purified by recrystallisation from acetone. Colourless, glistening crystals which melt at 87°–88.5°C are obtained.

Elementary analysis shows the following:

Found: 53.7% C 8.3% H 13.94% N
Calculated: 53.98% C 8.06% H 13.99% N

The mass spectrum indicates a moleculaar weight of 200 (theory 200.22). The following characteristic fragments are found, inter alia (in mass numbers): 183, 171, 142, 114, 113 and 99.

Accordingly, the substance corresponds to the following structure:

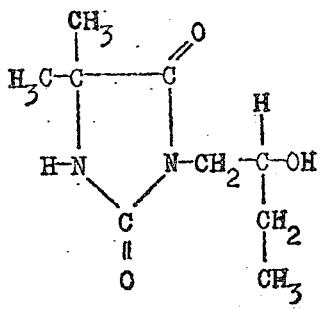

4. 3-(2'-Hydroxypropyl)-5,5-dimethyl-6-isopropyl-5,6-dihydrouracil.

A suspension of 276.5 g of 5,5-dimethyl-6-isopropyldihydrouracil (1.5 mols), 10 g of lithium chloride and 1750 ml of dimethylformamide is stirred at 50°C. 116.2 g of propene oxide (2.0 mols) are added dropwise thereto over the course of 210 minutes whilst stirring. The temperature is at the same time raised to 62°C, and the suspension changes to a clear, colourless solution. After the addition, the mixture is stirred for a further 12 hours at 86°–88°C. After cooling, the pH is adjusted to 7.0 (with a little 20% strength sulphuric acid), and the mixture is filtered, completely concentrated at 120°C under a waterpump vacuum and subsequently dried to constant weight at 120°C under 0.2 mm Hg.

An ochre-coloured, clear, slightly tacky, brittle substance is obtained in 95% yield (345 g); its analysis by combustion shows that the crude product obtained is the desired compound.

| Found: | Calculated for hydroxy-Propyl compound | Calculated for starting material |
|---|---|---|
| 9.3% H | 9.2% H | 8.8% H |
| 11.9% N | 11.6% N | 15.2% N |

5 3-(2'-Hydroxy-2'-phenyl-ethyl-5,5-dimethylhydantoin.

A solution of 508 g of 5,5-dimethylhydantoin (3.96 mols) and 5 g of lithium chloride in 550 ml of dimethylformamide is stirred at 125°–130°C.

534 g of 90% strength styrene oxide (4.00 mols) are added dropwise to this clear solution over the course of 90 minutes, whilst stirring. Thereafter the mixture is stirred for a further 4 hours at 120°C. After cooling to 25°C, the mixture is filtered, and the colourless, clear solution is concentrated at 80°C on a rotary evaporator, under a waterpump vacuum. It is then dried to constant weight at 80°C under 0.15 mm Hg. The crude product, which is obtained quantitatively, is recrystallised, without further characterisation, from 2.5 litres of acetone. 646.3 g (65.8% of theory) of colourless fine crystals, melting at 146°–146.4°C, are then obtained (without working up the mother liquor). Analysis by combustion shows that the desired product has been obtained.

| Found | Calculated |
|---|---|
| 62.86% C | 62.89% C |
| 6.40% H | 6.50% H |
| 11.55% N | 11.28% N |

Furthermore, the IR and NMR spectra are in agreement with the expected structure. The mass spectrum also shows that the structure given below is correct. The molecule-ion is detected at 248 MU (mass units), agreeing with the theoretical molecular weight of 238.3. Furthermore, the following fragments are found: 231 MU (= 248-OH); 171 MU (= 248-C$_6$H$_5$); 142 MU (= 248-C$_6$H$_5$CHO), 127 MU (= 124-CH$_3$) etc.

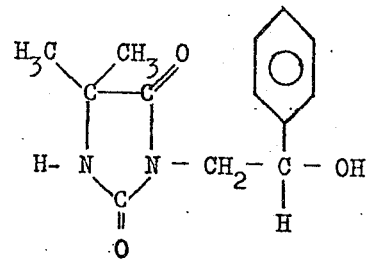

6. Manufacture of 3-(2-hydroxy-n-propyl)-5,5-pentamethylenehydantoin.

An amount of 1514 g of 5,5-pentamethylenehydantoin (9 moles) is stirred together with 33.6 g of potassium chloride and 3.6 litres of dimethylformamide at 60°C. There is then made to this thin suspension, within 2 hours, a dropwise addition of 575 g of propene oxide (9.9 moles); the temperature is raised during this operation to 70°C. After the propene oxide addition, the temperature is raised within 6 hours to 100°C; a clear solution is thus formed. After hot filtration, the solution is concentrated to dryness in a water-jet vacuum at 70°C. The resulting product is dried at 80°C under 0.3 Torr to constant weight. There is obtained an amount of 2005 g (98.6%) of a colourless to slightly yellowish crystalline mass, which melts at 157.7°C. (Mettler FP, 2°C/min).

The product can be purified by recrystallisation from methanol.

The thus produced alcohol corresponds to the following formula:

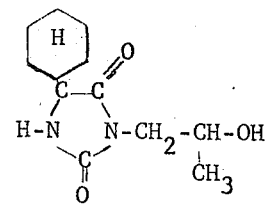

B. Diesters

1. Manufacture of the diester from 1 mol of sebacic acid and 2 mols of 3-(2'-hydroxyethyl)-5,5-dimethylhydantoin.

A mixture of 172 g of 3-(2'-hydroxyethyl)-5,5-dimethylhydantoin (1 mol), 101 g of sebacic acid (0.5 mol), 170 ml of toluene and 4.5 ml of concentrated sulphuric acid is heated to 110°C in a stirred apparatus with water separator. Hereupon the circulatory distillation starts, and the separation of water commences immediately. After 90 minutes, 15.5 ml of water have separated (86.1% of theory). After a total of 3.5 hours, 17 ml of water have separated (94.5% of theory), and the condensation is completed.

The mixture is cooled to 25°C, treated with 200 ml of toluene, and extracted by shaking with 70 ml of water; the wash water is immediately separated off and the organic phase is cooled to 10°C. Hereupon the diester crystallises out. After drying (60°C/20 mm Hg), 230 g of the crude diester (90.2% yield) are obtained. The binuclear dimethylhydantoin derivative obtained can be purified by recrystallisation from acetone. The purified product consists of colourless crystals which melt at 88°–89°C.

The infrared spectrum shows, through the absence of the OH absorption and the presence of the ester-carbonyl vibrations in addition to the carbonyl frequencies originating from the hydantoin ring, that the product corresponds to the formula given below:

sence of the OH frequencies of the alcohol; the absorptions to be allocated to the ester-carbonyl and hydantoin-carbonyl groups are at 1715 cm$^{-1}$, 1740 cm$^{-1}$ and 1815 cm$^{-1}$.

Elementary analysis shows that the material contains 12.9% N (calculated, 13.1%).

The proton-magnetic resonance spectrum (60 Mc H—NMR, recorded in deuterochloroform at 37°C, with tetramethylsilane as the internal standard) also shows, through the presence of the following signals, that the binuclear dimethylhydantoin derivative obtained possesses the structure given below:

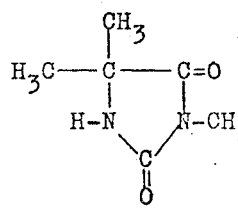  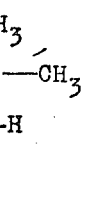  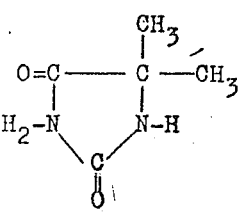

12 protons: δ = 1.45 (singlet): twice 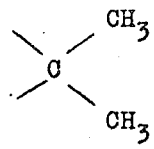

4 protons: δ = 2.60 (singlet): 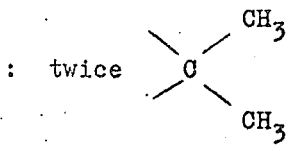

8 protons: δ = 3.70–3.90

δ = 4.20–4.40 (two triplets): twice 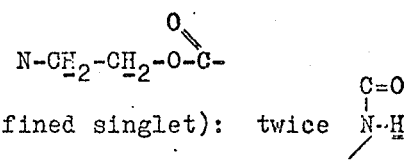

2 protons: δ = 6.60 (ill-defined singlet): twice

∑ 26 protons

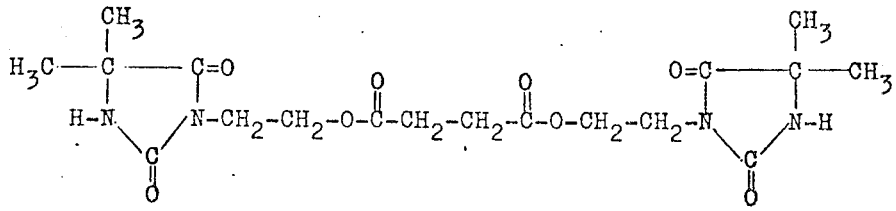

2. Manufacture of the diester from 1 mol of succinic acid and 2 mols of 3-(2′-hydroxyethyl)-5,5-dimethylhydantoin.

172 g of 3-(2′-hydroxyethyl)-5,5-dimethylhydantoin (1 mol) are condensed as described under instruction (B) (1), with 59 g of succinic acid (0.5 mol), with the addition of 170 ml of toluene and 3.0 ml of concentrated sulphuric acid, over the course of 3 hours at 105°–110°C.

On cooling to room temperature, the product crystallises out directly from the reaction mixture.

For purification, the crystalline mass is recrystallised from 1500 ml of acetone. 163.2 g of purified product (77% of theory), melting at 147°–148°C, are obtained.

The infrared spectrum (Nujol paste) shows the ab-

3. Manufacture of the diester from 1 mol of sebacic acid and 2 mols of 3-(2′-hydroxy-n-propyl)-5,5-dimethylhydantoin.

690 g of 3-(2′-hydroxy-n-propyl)-5,5-dimethylhydantoin (3.71 mols) are condensed with 375.2 g of sebacic acid (1.85 mols) in accordance with the instruction under (B) (1). 500 ml of toluene are used for the azeotropic removal of water; 10 ml of concentrated sulphuric acid are added as the catalyst. The condensation is carried out in 15 hours at 110°–118°C; 63.0 ml of water have then been removed (95% of theory). The reaction mixture is cooled to 35°C, treated with 500 ml of toluene and twice washed with 150 ml of water. Thereafter the organic phase is concentrated at 60°C on a rotary evaporator, under a waterpump vacuum. The product is subsequently dried to constant weight at 80°C/0.1 mm Hg. 929 g of a clear, transparent, light yellow, highly viscous product (92.9% of theory) are obtained, essentially consisting of the compound of the following structure:

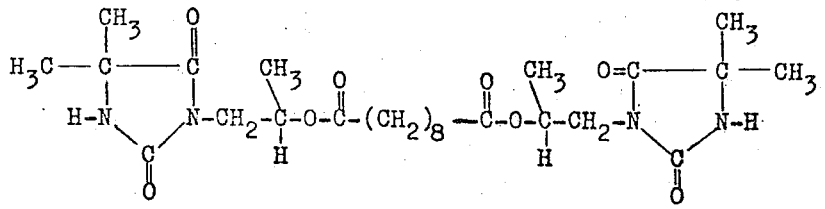

4. Manufacture of the diester from 1 mol of sebacic acid and 2 mols of 3-(2'-hydroxy-n-butyl)-5,5-dimethylhydantoin.

200 g of 3-(2'-hydroxy-n-butyl)-5,5-dimethylhydantoin (1 mol), 101 g of sebacic acid (0.5 mol), 3 ml of concentrated sulphuric acid and 170 ml of toluene are mixed and condensed over the course of 12 hours at 120°–122°C, in accordance with the instruction under B. 1. The reaction mixture is cooled to room temperature, diluted with 250 ml of toluene and successively eluted with 100 ml of water, 100 ml of 5% strength sodium bicarbonate solution and again with 100 ml of water. The organic phase is first concentrated and then dried, on a rotary evaporator, as described under instruction (B) (3). 269 g of a light yellow, clear, transparent, highly viscous resin (95% of theory) are obtained.

Elementary analysis shows 59.1%, C; 8.3%, H, and 9.5%, N; (calculated: 59.3%, C; 8.2%, H; and 9.9% N). The infrared spectrum further shows, through the absence of OH frequencies and through the presence of the ester-carbonyl absorptions, that the product obtained essentially consists of the compound of the following structure:

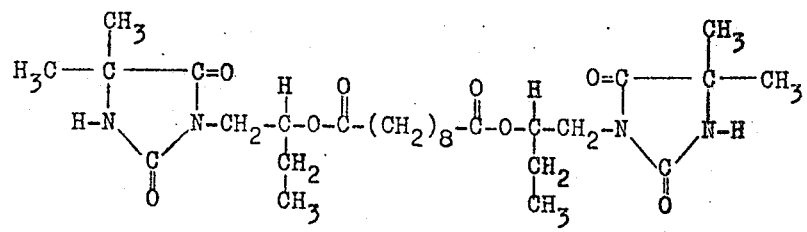

5. Manufacture of the diester from 1 mol of adipic acid and 2 mols of 3-(2'-hydroxy-n-butyl)-5,5-dimethylhydantoin.

142 g of 3-(2'-hydroxy-n-butyl)-5,5-dimethylhydantoin (0.71 mol) are condensed with 51.8 g of adipic acid (0.355 mol), with the aid of 142 ml of toluene and 3.6 g of concentrated sulphuric acid, analogously to the instruction under B. 4., over the course of 10 hours at 106°–108°C. 12.2 ml of water are separated off during this time (95.3% of theory). Working up takes place according to instruction (B) (4), and 167 g of a clear, transparent, slightly yellowish, highly viscous product are obtained, of which the infrared spectrum agrees with the following structure:

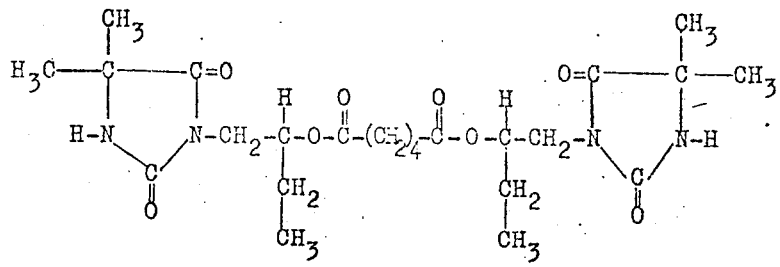

6. Manufacture of the diester from 1 mol of glutaric acid and 2 mols of 3-(2'-hydroxy-n-propyl)-5,5-dimethylhydantoin.

186 g of 3-(2'-hydroxy-n-propyl)-5,5-dimethylhydantoin (1 mol) are esterified with 66 g of glutaric acid (0.5 mol) in the presence of 5 g of p-toluenesulphonic acid and 150 ml of toluene, as described under instruction (B) (4), over the course of 12 hours at 115°C. After working up in accordance with instruction B. 4., a solid, amber-coloured product (150 g, corresponding to 64% of theory) is obtained, which essentially consists of the compound of the following formula:

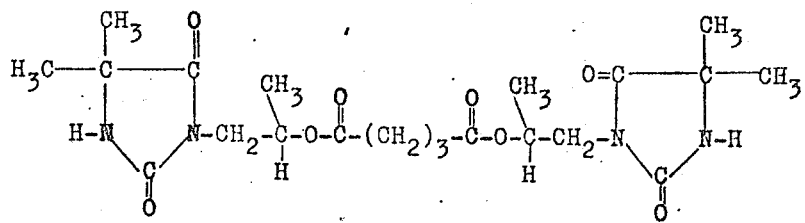

7. 148 g of the 3-(2'-hydroxy-2'-phenyl-ethyl)-5,5-dimethylhydantoin manufactured according to Example (A) (5) (0.596 mol) together with 60.3 g of sebacic acid (0.298 mol), 0.8 ml of concentrated sulphuric acid and 200 ml of toluene are subjected to an azeotropic circulatory distillation, whilst stirring. Whilst doing so, the bath temperature is 192°–194°C and the reaction temperature is 115°C. The water which has been distilled off azeotropically is separated off and removed. A further 2.5 ml of sulphuric acid are added in small portions over the course of 24 hours. After the indicated time, 10.7 ml of water have been separated off (100% of theory). The reaction mixture is then cooled to 0°C, whereupon a little unreacted starting product precipitates (melting point 130°C). The clear filtrate is twice extracted be shaking with 20 ml of water, separated off and concentrated to dryness at 50°–70°C under a waterpump vacuum, on a rotary evaporator. It is then dried to constant weight at 75°C under 0.2 mm Hg.

143.3 g (72.6% of theory) of a glassy brittle substance, which softens at 35°–40°C, are obtained.

Elementary analysis shows that the desired diester of the structure given below has been produced.

| Found | Calculated |
|---|---|
| 7.0% H | 7.0% H |
| 8.6% N | 8.5% N | with 125.2 g of sebacic acid, 400 ml of toluene and 9.5 ml of concentrated sulphuric acid are subjected to an azeotropic circulatory distillation whilst stirring, the bath temperature being 170°C and the reaction temperature 116°C. The period of reaction is 24 hours, in the course of which a further 7 ml of concentrated sulphuric acid are added.

20.5 ml of water separate (91% of theory). Working up takes place according to Example (B) (7). 346 g of the light brown, clear, viscous diester (85.8% of theory) are obtained.

9. A mixture of 894 g of 3(2'-hydroxy-n-propyl)-5,5-dimethylhydantoin (4.80 mols), 302.5 g of 71.4% strength oxalic acid (2.40 mols), 750 ml of benzene and 5 ml of 50% strength phosphoric acid is distilled azeotropically for 40 hours at 140°C bath temperature and 80°–81°C reaction temperature, whilst stirring, in the manner described in Example (B) (7). Over the course of this period, a further 40 ml of 50% strength phosphoric acid are added. 190 ml of water separate (97% of theory). The resulting colourless slurry is cooled to room temperature and diluted with 500 ml of ethyl acetate, and the thin suspension is twice washed with 200 ml of water. Thereafter, the new diester is isolated by filtration. After drying, 231 g of a fine colourless powder melting at 212.4°C are obtained. Analysis of the crude product by combustion shows a nitrogen content of 12.9% (calculated 13.1%); the new diester corresponds to the following formula:

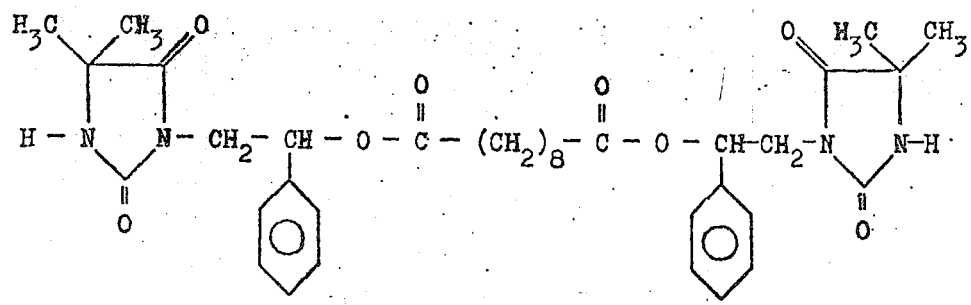

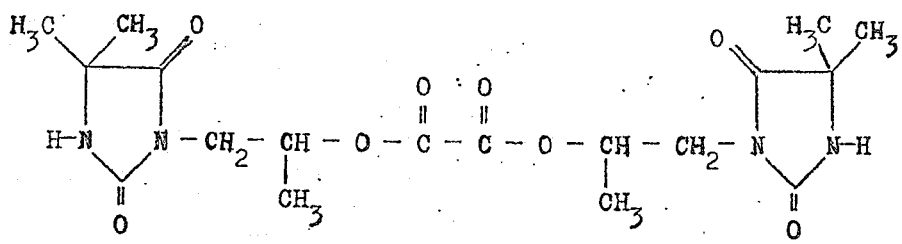

8. 300 g of the 3-(2'-hydroxy-n-propyl)-5,5-dimethyl-6-isopropyl-5,6-dihydrouracil manufactured according to Example (A) (4) (1.24 mols) together 10. Diester from sebacic acid and 3-(2-hydroxy-n-propyl)-5,5-pentamethylene-hydantoin.

An amount of 1245 g (5,5 moles) of 3-(2-hydroxy-n- propyl)-5,5-pentamethylene-hydantoin manufactured according to instruction A 6 are esterified with 455,2 g (2,25 moles) sebacic acid in 3.3 litres of toluene, under the catalytic effect of 50 ml of 50 % sulphonic acid, as described in instruction (B) (1). After 8 hours, the separation of water is complete. The warm solution is washed with 400 ml of 10 % of sodium hydroxide solution, till it is neutral, then it is washed with 1 litre of water. After separation, the solution is concentrated to dryness and then subsequently dries at 80°C/0,3 Torr to constant weight. There is thus obtained an amount of 1414 g (96 % of theory) of the desired diester. The crude product melts at 155°–158°C (Mettler FP 51: 1°C/min.). The crude diester can be purified by recrystallisation from choroform/acetone. The proton-magnetic resonance spectrum (60 Mc-HNMR) shows that the product corresponds to the formula given below:

through a column and removed from the apparatus. The xylene is separated from the methanol by extraction by shaking with water and, after drying, fed back to the reaction mixture. The diester formation is completed in this manner in about 48 hours. All volatile constituents are then distilled off at 190°C under 15 Torr, and the crude product, obtained in quantitative yield, isolated. This is purified by recrystallisation from a mixture of dimethylformamide and water (4:1), 5 ml of solvent being used to 1 g of substance. There is thus obtained from the above charge 1068.5 g (corresponding to 53.2% of theory) of the pure diester, M.P. 263.1°C (Mettler FP 51, 1°C/min) in the form of colourless fine crystals. The elementary analysis shows the following:

| Found | Calculated |
| --- | --- |
| 57.5 % C | 57.4 % C |
| 6.1 % H | 6.0 % H |
| 11.2 % N | 11.2 % N |

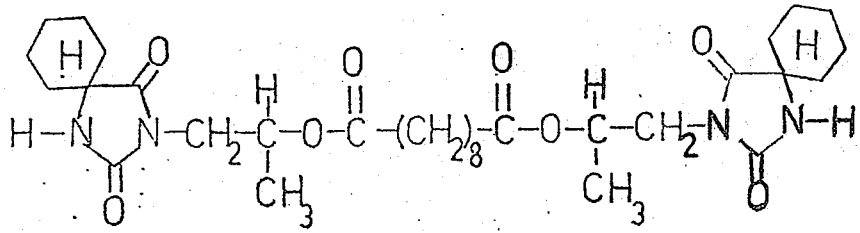

11. Diester from trimethyladipic acid (isomer mixture) and 3-(2'-hydroxy-n-propyl)-5,5-dimethylhydantoin.

An amount of 1130 g of trimethyladipic acid (commercial mixture of isomers) (6.0 moles) is heated together with 1.5 litres of toluene and 2456 g of 3-(2'-hydroxy-n-propyl)-5,5-dimethylhydantoin (13.2 moles), and the mixture, under the catalytic effect of 100 ml of 50% sulphuric acid, and with stirring and azeotropic circulatory water distillation, esterified, the process taking about 30 hours. Additions are then made of 80 g of active charcoal and 50 g of Aerosil, and stirring continues for 30 minutes at 70°C. The solution is then filtered clear, diluted with 2 litres of chloroform, and then washed once with 500 ml of 10% sodium hydroxide solution and twice with 1 litre of water each time. After separation, the solution is concentrated at 70°C in a water-jet vacuum, and subsequently dried at 80°C/0.3 Torr to constant weight. There is thus obtained an amount of 2258 g (71.7% of theory) of the desired diester in the form of a highly viscous, clear, light-brown substance.

12. Diester from terephthalic acid and 3-(2'-hydroxy-n-propyl)-5,5-dimethylhydantoin.

A mixture of 776 g of dimethylterephthalate (4 moles), 1488 g of the alcohol used in 11.) (8 moles), 2 l of xylene, 6 g of lead-II-oxide, 7 g of tetraisopropylorthotitanate and 6.5 g of antimonous-III-oxide is caused to react at 145°C. During the reaction, the azeotrope from methanol and xylene is distilled off And likewise the spectroscopical findings are in agreement with the following structure:

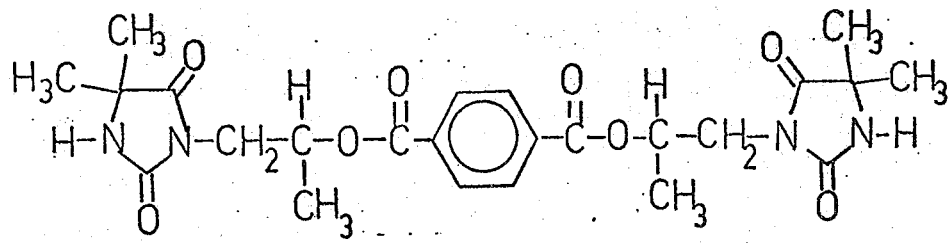

13. Diester from isophthalic acid and 3-(2'-hydroxy-n-propyl)-5,5-dimethylhydantoin.

In an analogous manner to that of (12), the corresponding isophthalic acid ester is produced by the reaction of 194.2 g of isophthalic acid dimethyl ester (1 mole) with 372.4 g of 3-(2'-hydroxy-n-propyl)-5,5-dimethylhydantoin (2 moles) in 700 ml of xylene, in the presence of 2 g of lead-II-oxide, 2 g of antimonous-III-oxide and 2 g of tetraisopropyl-ortho-titanate. The processing procedure is carried out according to (12). There is then obtained 489 g (98.3% of theory) of crude product, which is purified by recrystallisation from ethyl acetate to obtain 234.3 g (46.6% of theory) of colourless crystals melting at 202°–205°C. The elementary analysis gives the following results:

| Found | Calculated |
| --- | --- |
| 57.1 % C | 57.4 % C |
| 6.1 % H | 6.0 % H |
| 11.2 % N | 11.2 % N |

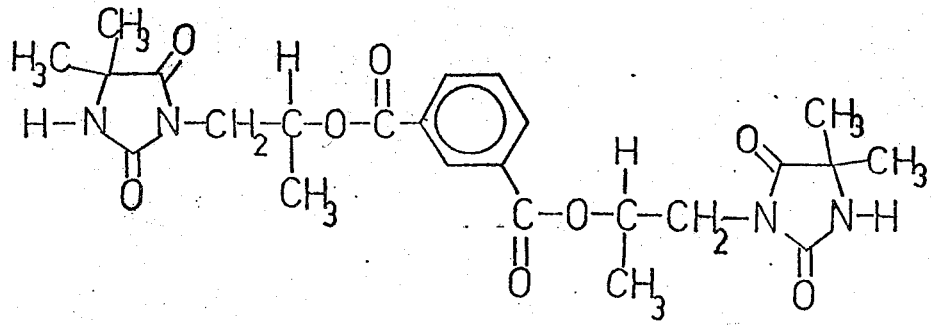

14. Diester from hexahydrophthalic acid and 3-(2'-hydroxy-n-propyl)-5,5-dimethylhydantoin.

There is obtained, by esterification of 115.5 g of hexahydrophthalic acid anhydride (1.5 moles) with 280 g of 3-(2'-hydroxy-n-propyl)-5,5-dimethylhydantoin (0.75 mole) in 250 ml of toluene, with 15 g of conc. sulphuric acid as catalyst, a light-brown, clear reaction mixture, from which are removed by circulatory water distillation, within 20 hours, 13.50 ml of water (100% of theory). The processing procedure is according to (11). There is thus obtained an amount of 332.4 g (87.3% of theory) of a clear, resin-like, light-brown substance corresponding to the following formula:

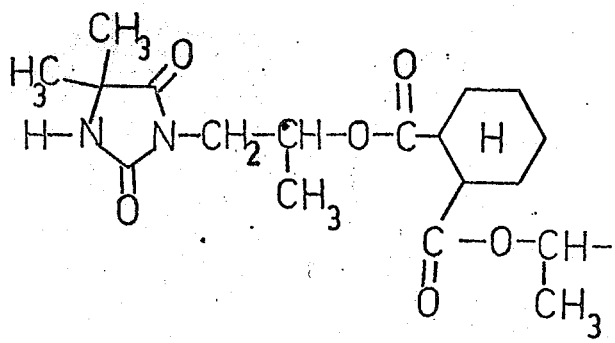

15. Diester from phthalic acid and 3-(2'-hydroxy-n-propyl)-5,5-dimethylhydantoin.

An amount of 372 g of 3-(2'-hydroxy-n-propyl)-5,5-dimethylhydantoin (2 moles) is esterified with 1 mole of phthalic acid (166.1 g) in 300 ml of toluene, in the presence of 15 g of concentrated sulphuric acid. The reaction is complete after 24 hours. The reaction mixture is cooled to 50°C, diluted with 1 l of chloroform, and then processed according to (11). There is thus obtained, after drying to constant weight, an amount of 441.3 g (87.9% of theory) of a solid mass of which the melting point is 67°–69°C, and which consists of the crude diester.

16. Diester from adipic acid and 3-(2'-hydroxy-n-propyl)-5,5-dimethylhydantoin.

An amount of 292.3 g of adipic acid (2 moles) is esterified, in the manner described under (11), with 744 g of 3-(2'-hydroxy-n-propyl)-5,5-dimethylhydantoin (4 moles) in 600 ml of toluene, in the presence of 20 g of conc. sulphuric acid, the operation taking 7 hours. After processing analogously to (11), a light-coloured, clear, highly viscous substance to the amount of 964 g (100% of theory) is obtained, which slowly crystallises out. For purification, a part of the substance is recrystallised from dioxane. Colourless crystals are obtained which melt at 151.3°C (Mettler FP 51; 2°C/min). The elementary analysis gives the following results:

| Found | Calculated |
| --- | --- |
| 54.6 % C | 54.7 % C |
| 7.0 % H | 7.1 % H |
| 11.3 % N | 11.6 % N |

The H-NMR-spectrum is in agreement with the following structure:

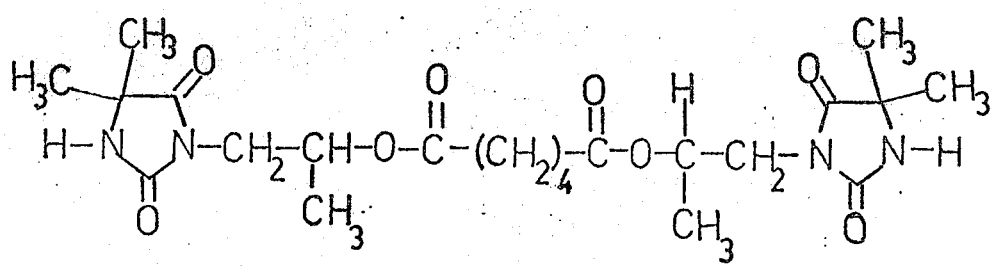

MANUFACTURING EXAMPLES.

EXAMPLE 1

A mixture of 929.0 g (1.725 mols) of the diester from

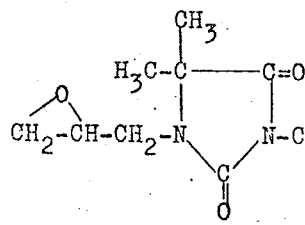 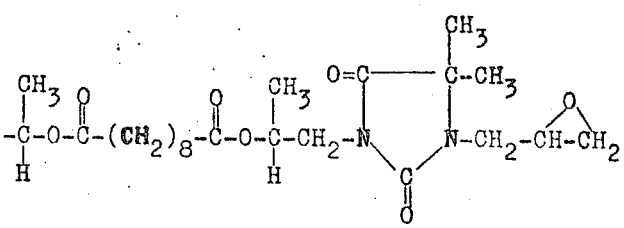

1 mol of sebacic acid and 2 mols of 3-(2'-hydroxy-n-propyl)-5,5-dimethylhydantoin, manufactured according to instruction (B) (3), 3200 g of epichlorohydrin (34.5 mols) and 11.3 g of a 50% strength aqueous solution of tetramethylammonium chloride is warmed to 60°C, whilst stirring. Thereafter, an azeotropic circulatory distillation is started at 60°C and 60–80 mm Hg. 332 g of 50% strength aqueous sodium hydroxide solution (4.15 mols) are then added dropwise under these conditions over the course of 60 minutes, with vigorous stirring; at the same time water present in the reaction mixture is continuously removed from the system and separated off. After completion of the addition of the sodium hydroxide solution, distillation is continued for a further 15 minutes in order to remove the residual water as completely as possible. In total, 220 ml of water are separated off (96.5% of theory).

The mixture is now cooled to 20°C and the sodium chloride produced in the reaction is removed by filtration. The sodium chloride precipitate is rinsed with 150 ml of epichlorohydrin. The combined epichlorohydrin solutions are extracted by shaking with 200 ml of water. The organic layer is then completely concentrated at 70°C on a rotary evaporator, under a waterpump vacuum, and is subsequently dried to constant weight at 85°–90°C under 0.1 mm Hg. 1041 g (93% of theory) of a clear, transparent, pale amber-coloured, highly viscous epoxide resin are obtained. The epoxide content is 3.06 equivalents/kg (99% of theory). The total chlorine content is 0.5%. The new epoxide resin essentially consists of the compound of the following structure:

EXAMPLE 2

240 g (0.4238 mol) of the diester, manufactured according to instruction (B) (4), from 1 mol of sebacic acid and 2 mols of 3-(2'-hydroxybutyl)-5,5-dimethylhydantoin, together with 1176 g of epichlorohydrin (12.72 mols) and 2.105 g of tetraethylammonium chloride (3 mol percent) are stirred for 60 minutes at 116°–117°C. A pale yellow clear solution is thereby produced. An azeotropic circulatory distillation is then started at 60°C, as described in Example 1, and 84.8 g of 50% strength aqueous sodium hydroxide solution are added dropwise over the course of 60 minutes. The procedure mentioned in Example 1 is followed, and the mixture is worked up in accordance with Example 1. 276 g of a pale yellow, clear, transparent, highly viscous epoxide resin (96.1% of theory) are obtained, having an epoxide content of 3.0 equivalents/kg and a total chlorine content of 0.8%.

The proton-magnetic resonance spectrum (60 Mc—HNMR, recorded in $CDCl_3$ at 37°C, with tetramethylsilane as the internal standard) shows inter alia through the presence of the following signals, that the new epoxide resin essentially consists of the compound of the following structure:

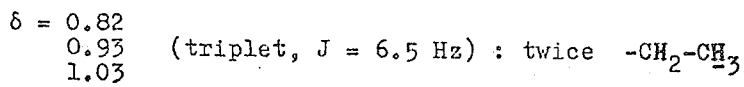

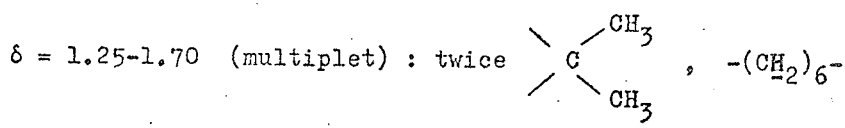

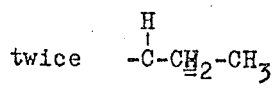

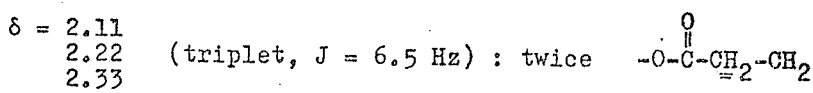

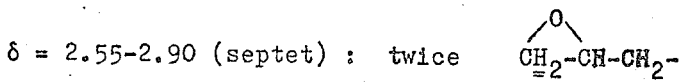

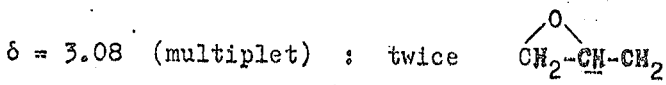

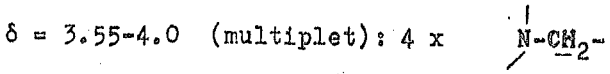

δ = 4.84–5.13 (multiplet): 2 x 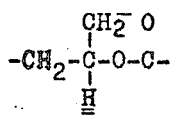

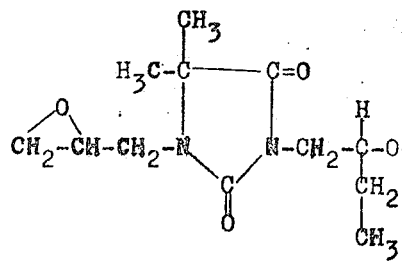 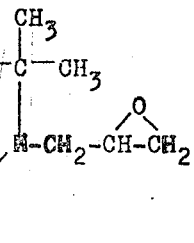

EXAMPLE 3

A mixture of 135 g (0.2648 mol) of the diester, manufactured according to instruction (B) (1), from 1 mol of sebacic acid and 2 mols of 3-(2'-hydroxyethyl)-5,5-dimethylhydantoin, 735 g of epichlorohydrin (7.94 mols) and 1.315 g of tetraethylammonium chloride is stirred for 60 minutes at 100°C; a clear, colourless solution is thereby produced. An azeotropic circulatory distillation is now started at 60°C, as described in Example 1, and 52.9 g of 50% strength aqueous sodium hydroxide solution (0.331 mol) are added dropwise over the course of 60 minutes, with vigorous stirring. During this operation, and during the subsequent working up, the procedure according to Example 1 is followed.

The new epoxide resin, which has an epoxide content of 3.09 equivalents/kg (96% of theory) and a total chlorine content of 0.8%, is obtained in 81% yield (133.5 g).

The new epoxide resin essentially corresponds to the compound of the following structure:

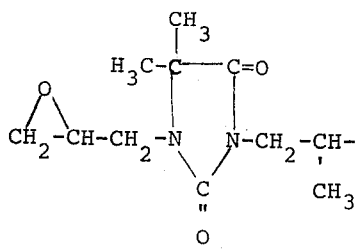

EXAMPLE 4

135 g (0.2885 mol) of the diester, manufactured according to instruction (B) (6), from 1 mol of glutaric acid and 2 mols of 3-(2'-hydroxy-n-propyl)-5,5-dimethylhydantoin, 1329 g of epichlorohydrin (14.36 mols) and 2.4 g of tetraethylammonium chloride are mixed, and the mixture is stirred for 120 minutes at 100°C. This clear solution is dehydrohalogenated, as described in more detail in Example 1, with 95,8 g of 50% strength aqueous sodium hydroxide solution over the course of 1 hour at 60°C, whilst stirring vigorously and continuously separating off water. The mixture is worked up in accordance with Example 1. 150.2 g of a clear, viscous epoxide resin (89.7% of theory) are obtained, having an epoxide content of 3.45 equivalents/kg (100% of theory) and a total chlorine content of 0.6%.

The proton-magnetic resonance spectrum shows that the end product has the following structure:

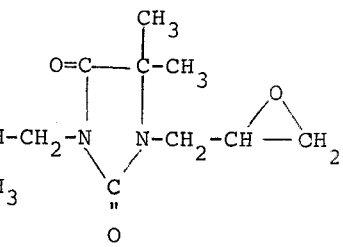

EXAMPLE 5

113.9 g (0.2673 mol) of the diester, manufactured according to instruction (B) (2), from 1 mol of succinic acid and 2 mols of 3-(2'-hydroxyethyl)-5,5-dimethylhydantoin, together with 741 g of epichlorohydrin and 1.3 g of tetraethylammonium chloride, are stirred for 60 minutes under reflux at 116°–118°C. Thereafter the product is dehydrohalogenated with 53.4 g of 50% strength sodium hydroxide solution, in accordance with Example 1, for one hour at 60°C, whilst stirring vigorously and continuously removing water from the system. The product is worked up analogously to Example 1, and 141 g (98.3% of theory) of a clear, transparent, practically colourless, highly viscous epoxide resin are obtained, having an epoxide content of 3.09 equivalents/kg (83.2% of theory). The new epoxide resin corresponds essentially to the formula:

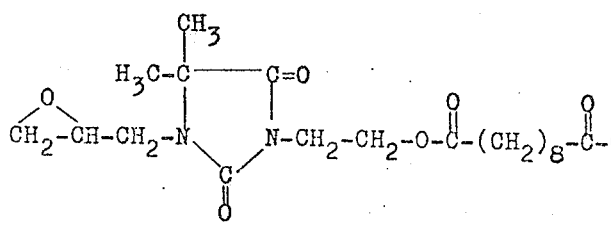 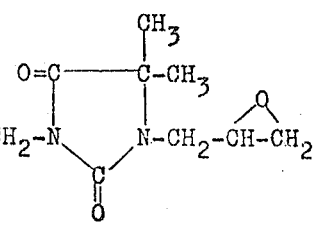

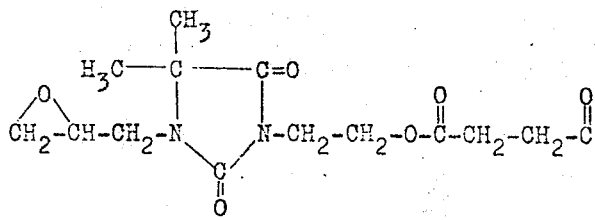
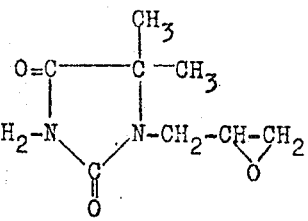

EXAMPLE 6

A solution of 126 g of the diester manufactured ac-

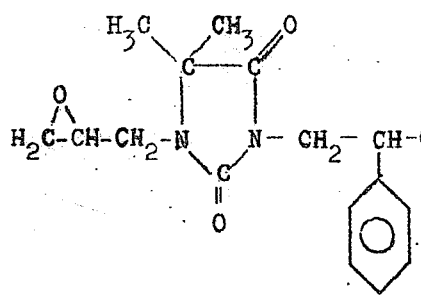

cording to Example (B) (7) (0.19 mol), 1.3 g of 50% strength aqueous tetramethylammonium chloride and 740 g of epichlorohydrin (8.0 mols) is stirred for 45 minutes at 60°C. An azeotropic circulatory distillation is then so adjusted, by applying a vacuum (60–80 mm Hg) at 140°C bath temperature, that the temperature in the reaction flask is 59°–60°C.

36.5 g of 50% strength aqueous sodium hydroxide solution are then added dropwise over the course of 100 minutes, with vigorous stirring; at the same time the water present in the reaction mixture is continuously distilled off azeotropically and separated off. After completion of the addition of the sodium hydroxide solution, circulatory distillation is continued for a further 30 minutes.

Thereafter the mixture is cooled to 40°C and the sodium chloride produced during the reaction is removed

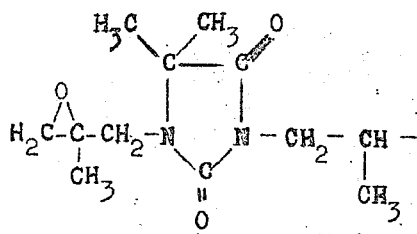

by filtration. The epichlorohydrin solution is twice extracted by shaking with 50 ml of water, in order to remove remnants of sodium hydroxide and of sodium chloride. After separating off the aqueous phase, the solution is concentrated to dryness at 60°C on a rotary evaporator, under a waterpump vacuum; 50 ml of water are then added and distilled off. Thereafter, the traces of water are removed by adding 50 ml of toluene and distilling off azeotropically. The product is then dried to constant weight at 60°C under 0.2 mm Hg (4 hours). A clear, pale yellowish, viscous epoxide resin with 2.9 epoxide equivalents/kg, having a total chlorine content of less than 0.3%, is obtained in 98.4% yield (145 g). The NMR spectrum essentially agrees with the following structure:

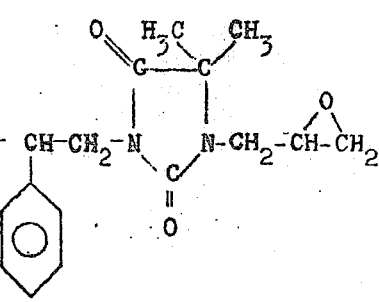

EXAMPLE 7

161.4 g of the diester manufactured according to Example (B) (3) (0.3 mol) together with 12.0 g of 50% strength aqueous tetraethylammonium chloride and 639 g of β-methylepichlorohydrin (6.0 mols) are stirred for 45 minutes at 60°C, analogously to Example 6. The product is then dehydrohalogenated with 57.7 g of 50% strength aqueous sodium hydroxide solution (0.722 mol), in accordance with Example 6. Working up is also effected exactly in accordance with Example 6.

168 g of a light yellow, clear epoxide resin (82.6% of theory) are obtained. The epoxide content is 3.07 epoxide equivalents/kg and the total chlorine content is less than 0.3%. The new epoxide resin essentially corresponds to the following structure:

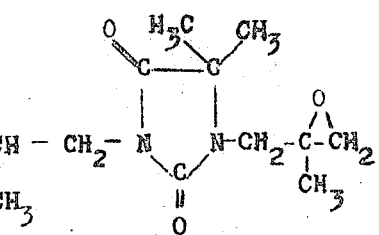

EXAMPLE 8

333 g of the diester manufactured according to Example (B) (8) (0.512 mol) are stirred with 1000 g of epichlorohydrin (10.8 mols) and 3.40 g of 50% strength aqueous tetramethylammonium chloride at 60°C, in accordance with Example 6. The product is then dehydrohalogenated with 98.4 g of 50% strength aqueous sodium hydroxide solution (1.23 mols), as described in Example 6.

After working up according to Example 6, 386 g of a clear, light ochre-coloured epoxide resin (98% of theory) are obtained, having an epoxide content of 1.8 epoxide equivalents/kg (68.7% of theory).

EXAMPLE 9

A mixture of 192 g of the bis-oxalate ester manufactured according to Example (B) (9) (0.45 mol) with 1760 g of epichlorohydrin (19 mols) and 3 g of 50% strength aqueous tetramethylammonium chloride solution is warmed for 1 hour to 90°C whilst stirring, analogously to Example 6. The thick suspension is then dehydrohalogenated with 86.4 g of 50% strength aqueous sodium hydroxide solution (1.08 mols) in accordance with Example 6. The reaction is incomplete, since the starting product is only partially dissolved in the reaction medium.

The mixture is nevertheless worked up in accordance with Example 6, and 86 g of an epoxide resin (36% of theory) are obtained, containing 1.95 epoxide equivalents/kg (52% of theory).

EXAMPLE 10

Additions of 3870 g of epichlorohydrin (41.8 moles) and 11.9 g of 50% aqueous tetramethylammonium chloride solution are made, exactly in the manner described in the manufacture example 1, to 1116 g of the diester (1.8 moles) produced according to (10), the whole being then reacted. Dehydrohalogenation is carried out with 347.5 g of 50% sodium hydroxide solution, with this and the following procedure being performed according to Example 1.

There is obtained an amount of 1124 g (85.2% of theory) of a light-yellow viscous epoxide resin having an epoxide content of 3.07 equivalents/kg. The total chlorine content is 0.7%. The new sebacic acid-di-(1-glycidyl-5,5-pentamethylenehydantoin-3-yl-propyl-(2))-ester corresponds to the following structure:

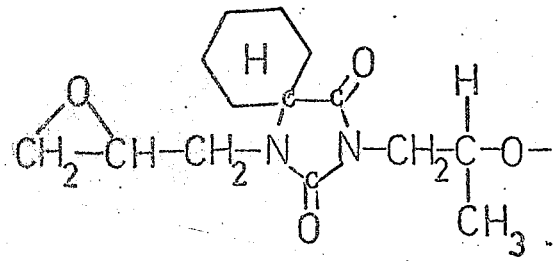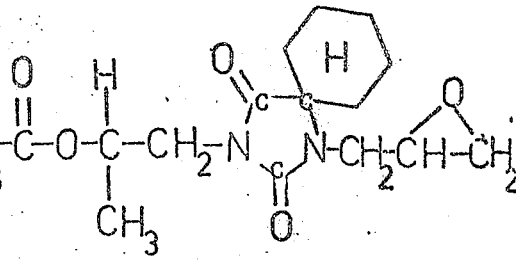

EXAMPLE 11

An amount of 1049 g of the diester (2 moles) produced according to (11) is reacted, exactly analogously to Example 1, with 3700 g of epichlorohydrin (40 moles) under the action of 13 g of 50% aqueous tetramethylammonium chloride, and with 368 g of 50% aqueous sodium hydroxide solution (4.6 moles) for dehydrohalogenation. The processing of the charge and the isolation of the product are effected likewise according to Example 1. There is obtained an amount of 1050 g of a clear, brown, viscous resin (82.5% of theory), the epoxide content of which is 3.25 equivalents/kg. The total chlorine content is below 0.3%, 0.1% being hydrolysable chlorine and 0.023% ionogenic chlorine. The elementary analysis gives the following results:

| Found | Calculated |
|---|---|
| 58.40 % C | 58.47 % C |
| 7.60 % H | 7.60 % H |

The new epoxide resin corresponds essentially to the following structure:

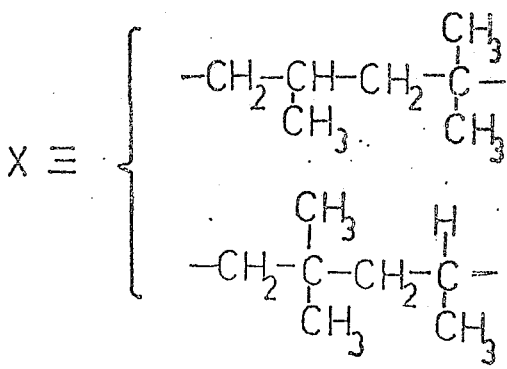

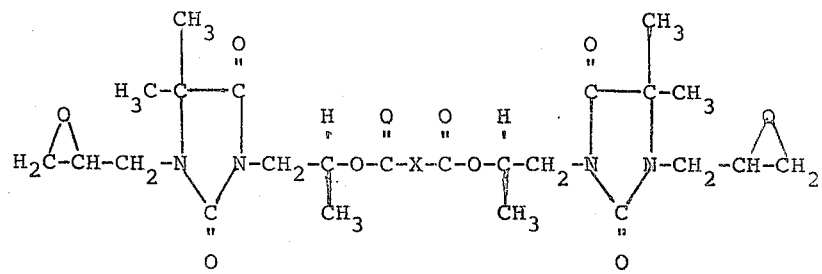

EXAMPLE 12

An amount of 640 g of the pure diester (1.275 moles) produced according to (12) is glycidylated, as described in Example 1, by means of 2360 g of epichlorohydrin (25.5 moles), 8.4 g of 50% aqueous tetramethylammonium chloride and 246 g of 50% aqueous sodium hydroxide solution (3.06 moles). The processing is carried out also according to Example 1. There is thus obtained an amount of 749 g (95.7% of theory) of a colourless product having an appearance similar to wax and containing 3.40 epoxide equivalents/kg; the total chlorine content is 0.5%. The crude product can be purified by recrystallisation from acetone. Colourless crystals are then obtained which melt at 140.2°C (Mettler FP 51, 2°C/min) and which have an epoxide content of 3.26 epoxide equivalents (100% of theory). The elementary analysis and the 60 Mc H—NMR-spectrum show that the product corresponds to the following formula:

|  | Found |  | Calculated |  |
|---|---|---|---|---|
|  | 58.33 | % C | 58.62 | % C |
|  | 6.32 | % H | 6.23 | % H |
|  | 9.02 | % N | 9.12 | % N |
| less than | 0.30 | % chlor. | 0.00 | % chlorine |

EXAMPLE 13

An amount of 227 g of the purified diester (0.452 mole) produced according to (13) is reacted, exactly in the manner described in Example 1, with 841 g of epichlorohydrin (9.05 moles), 3.0 g of 50% aqueous tetramethylammonium chloride and 87.3 g of 50% aqueous sodium hydroxide solutions (1.09 moles), and then processed likewise as described in the said example. There is obtained 268 g (96.4% of theory) of a light-yellow, highly viscous resin having 3.7 epoxide equivalents/kg and a chlorine content of 1.4%. The new epoxide resin corresponds essentially to the following formula:

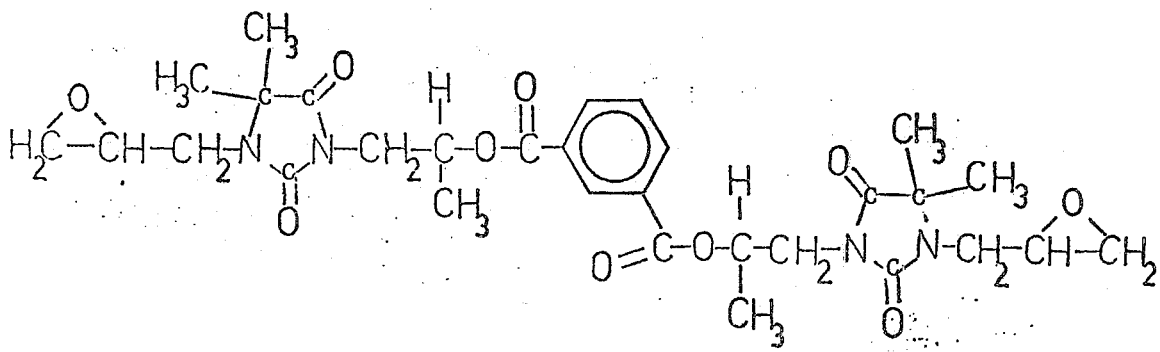

EXAMPLE 14

An amount of 203 g of the diester (0.4 mole) produced according to (14) is glycidylated according to Example 1, with application of the following reactants:
1110 g of epichlorohydrin (12 moles)
2 g of tetraethylammonium chloride, anhydrous,
77 g of 50% aqueous sodium hydroxide solution (0.963 mole)

The processing and isolation of the product are effected likewise according to Example 1, with the aid of 250 ml of epichlorohydrin for subsequent washing and 180 ml of water for extraction of the solution.

There is obtained an amount of 213 g of a highly viscous, resin-like diepoxide (86% of theory), the epoxide content of which is 3.05 equivalents/kg (94.4% of theory); the total chlorine content is 1.2%. The new epoxide resin has the following structure:

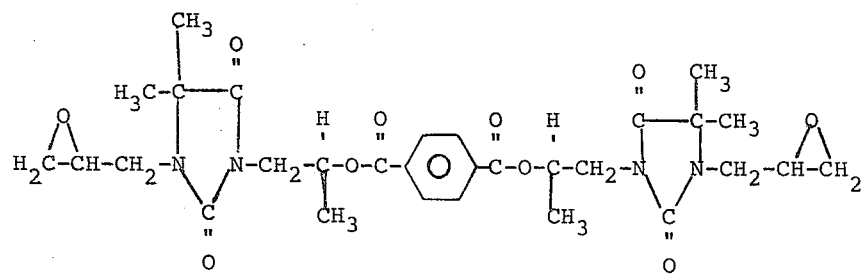

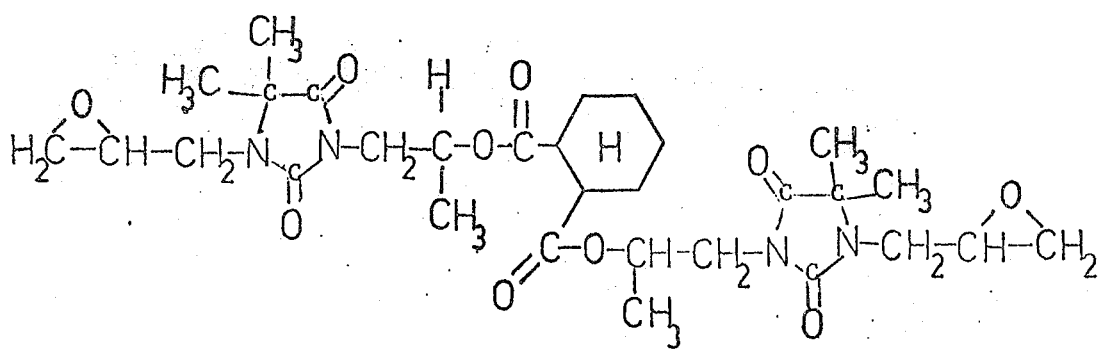

EXAMPLE 15

The following are reacted according to Example 1:

| | | |
|---|---|---|
| 94 | g of diester, produced according to (15) | (0.17 mole), |
| 346 | g of epichlorohydrin | (3.74 moles), |
| 0.9 | g of tetraethylammonium chloride, anhydrous, | |
| 36 | g of 50% aqueous sodium hydroxide solution. | |

The processing after the reaction is carried out analogously to that described in Example 1, and the following product is isolated:

An amount of 80 g (69.6% of theory) of a viscous resin having 3.12 epoxide equivalents (kg) (95.7% of theory). The total chlorine content is 0.5%. The epoxide resin has, according to NHR, essentially the following structure:

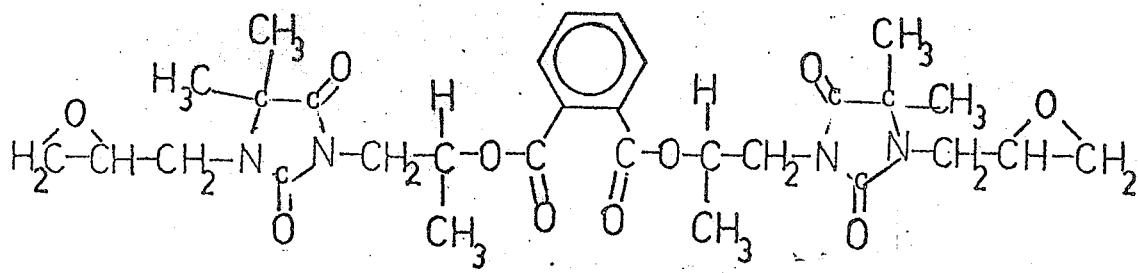

EXAMPLE 16

An amount of 798 g of the diester (1.66 moles) obtained according to (16) is reacted in the manner described in Example 1 with 3085 g of epichlorohydrin (33.4 moles), 10.9 g of 50% aqueous tetramethylammonium chloride and 318.5 g of 50% aqueous sodium hydroxide solution (3.98 moles). After the usual processing (cp. Example 1, etc.), 895.1 g (91.0% of theory) of a clear, pale yellowish, viscous epoxide resin is obtained, the epoxide content of this being 3.54 equivalents/kg and the total chlorine content 0.5%.

The product can be purified by recrystallisation from methanol/water (1:1). There is thus obtained a colourless crystallisate which melts at 106.1°C (Mettler FP 51, 2°C/min). The epoxide content is then 3.37 equivalents/kg (100% of theory). The elementary analysis gives the following results:

| | Found | | Calculated | |
|---|---|---|---|---|
| | 56.3 | % C | 56.5 | % C |
| | 7.1 | % H | 7.1 | % H |
| | 9.3 | % N | 9.4 | % N |
| less than | 0.3 | % chlor. | 0.0 | % chlorine |

The mass spectrum shows, with the molecule-ion detected at 594 mass units (molecular weight theory 594), and by characteristic fragmentations, that the desired product has been obtained; this is confirmed also by the H-NMR-spectrum.

USE EXAMPLES a. Amine Curing Reactions

EXAMPLE I 75 parts of the epoxide resin manufactured according to Example 1, containing 3.06 epoxide equivalents/kg, are mixed with 25 parts of 1,4-butanediol-diglycidyl-ether as a reactive diluent and with 20 parts of triethylenetetramine, at room temperature, and the mixture is poured into casting moulds made of aluminium. Curing takes place for 48 hours at room temperature. The resulting mouldings possess the properties indicated below:

| | | |
|---|---|---|
| Flexural strength, VSM 77,103 | = | 2–3 Kp/mm$^2$ (no Fracture at maximum deflection) |
| Deflection, VSM 77,103 | = | >20 mm |
| Impact strength, VSM 77,105 | = | >100 cmkp/cm$^2$ |
| Heat distortion point according to Martens, DIN 53,458 | = | <RT °C |
| Water absorption after 4 days at 25°C, 60×10×4 mm test rod | = | 2–3 % by weight |

EXAMPLE II 65 parts of the epoxide resin manufactured according to Example 1, containing 3.06 epoxide equivalents/kg, are mixed with 35 parts of the diglycidyl-ether of $\Delta^3$-cyclohexene-dimethanol-1,1 as a reactive diluent and 30 parts of a medium-viscosity adduct curing agent containing amine groups (manufactured by warming a mixture of 77 parts of a medium-viscosity diomethane-polyglycidyl-ether resin having an epoxide content of approx. 5.0 equivalents/kg and a viscosity of 13,000–16,000 cP, and of 158 parts of technical trimethylhexamethyleneamine, and subsequent addition of 39 parts of phenol), having a $H_{active}$-content =

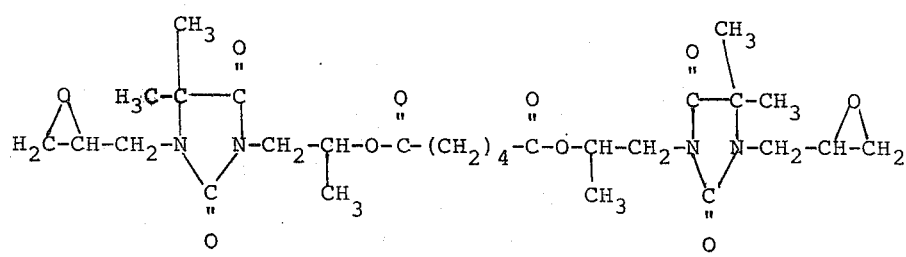

67, at room temperature, and the mixture is poured into casting moulds made of aluminium. Curing took place over the course of 48 hours at room temperature. The resulting mouldings have the following properties:

| | | |
|---|---|---|
| Flexural strength, VSM 77,103 | = | 1–2 kp/mm² (no fracture at maximum deflection) |
| Deflection, VSM 77,103 | = | >20 mm |
| Impact strength, VSM 77,105 | = | >100 cmkp/cm² |
| Heat distortion point according to Martens, DIN 53,458 | = | <RT °C |
| Water absorption after 4 days at 25°C (60×10×4 mm test rod) | = | 0.8–1.2 per cent by weight |
| Water absorption after 1 hour at 100°C (60×10×4 mm test rod) | = | 1–2 per cent by weight |

EXAMPLE III 93 parts of the epoxide resin manufactured according to Example 1, containing 3.06 epoxide equivalents/kg, are mixed with 7.0 g of triethylenetetramine at 40°C and the mixture is poured into a casting mould made of aluminium (4 mm wall thickness). Curing takes place over the course of 24 hours at 45°C. A moulding possessing the following mechanical properties is obtained:

| | | |
|---|---|---|
| Flexural strength, VSM 77,103 | = | 9.1 kp/mm² |
| Deflection, VSM 77,103 | = | 6.4 mm |
| Impact strength, VSM 77,105 | = | 37.5 cmkp/cm² |
| Boiling water absorption (1 hour) | = | 3.6% |

EXAMPLE IV 80 g of the epoxide resin manufactured according to Example 3, containing 3.09 equivalents/kg, are mixed In the following comparison test it is shown that certain mechanical properties, especially the impact strength, of the casting obtained by curing the epoxide resin according to Example III are better than those of the casting obtained by executing Example I of the U.S. Pat. No. 3,542,803:

A mixture of 211 g of 1,12-bis(5′,5′-dimethylhydantoinyl-3′)-dodecane (0.5 mol), 1387,5 g of epichlorhydrin (15 mols) and 0.5 g of tetramethylammonium chloride was heated to 117°C for 5 hours. A resin sample contained 1.3 epoxide equivalents/kg. 45.36 g of 97% strength sodium hydroxide were added in portions to the solution cooled to 60°C over the course of 35 minutes. The temperature was kept at 60°C by slight cooling. After addition of the sodium hydroxide the mixture was stirred for a further 30 minutes at 60°C. The reaction mixture was then concentrated in a vacuum of 35 mm Hg until the entire quantity of the water of reaction had been distilled off azeotropically. Thereafter the sodium chloride which had formed was filtered off and washed with a little epichlorhydrin. The reaction product was then further concentrated, firstly at a vacuum of 30 mm Hg in order to recover the excess epichlorhydrin and finally in a high vacuum. 266 g of 1,12-bis-(N-glycidyl-5′,5′-dimethyl-hydantoinyl-3)-didecane (99,5% of theory) were obtained. The light brown viscous resin contained 1.0% of chlorine and 3,86 epoxide equivalents/kg and had a viscosity of 12,000 cp at 20°C. 100 parts of this compound were mixed with 9 parts of triethylene tetramine. The resin-curing agent mixture had a pot life of 3000 cp. of 40 minutes at 40°C. The resin-curing agent mixture was cast into prewarmed aluminium moulds (4 mm thick sheets for mechanical measurements) and cured for 24 hours at 40°C and then for 6 hours at 100°C to give castings. The castings had the following properties:

| | |
|---|---|
| Flexural strength according to VSM 77,103: no fracture on maximum deflection, | 6.5 kg/mm² |
| Deflection according to VSM 77,103: | 20 mm |
| Impact strength according to VSM 77,105: | 23,4 cmkg/cm² |
| Heat distortion point according to Martens (DIN): | 34°C. |

EXAMPLE IV 80 g of the epoxide resin manufactured according to Example 3, containing 3.09 epoxide equivalents/kg, are mixed with 6.4 g of triethylenetetramine at 40°C. The homogeneous, clear mixture is cured in an aluminium mould for 24 hours at 40°–45°C. A moulding having the following properties is obtained:

| | | |
|---|---|---|
| Flexural strength, VSM 77,103 | = | 1–2 kp/mm² no fracture at maximum deflection |
| Deflection, VSM 77,103 | = | 20.0 mm |
| Impact strength, VSM 77,105 | = | 33–36 cmkg/cm² |
| Cold water absorption, 4 days at 20°C | = | 0.54% | b. Curing with Anhydrides.

EXAMPLE V 68.6 g of the epoxide resin manufactured according to Example 4 (3.45 epoxide equivalents/kg) are mixed with 31.3 g of hexahydrophthalic anhydride at 70°C to give a clear, homogeneous melt. This mixture is cured in an aluminium mould for 2 hours at 80°C + 13 hours at 150°C. A casting having the following properties is obtained:

| | | |
|---|---|---|
| Flexural strength, VSM 77,103 | = | 14.15 kp/mm² |
| Deflection, VSM 77,103 | = | 7–8 mm |
| Impact strength, VSM 77,105 | = | 12–14 cmkp/cm² |
| Heat distortion point according to Martens, DIN 53,458 | = | 71 °C |
| Cold water absorption, 4 days at 20°C | = | 0.7% |

EXAMPLE VI 114 g of the epoxide resin manufactured according to Example 1, containing 3.06 epoxide equivalents/kg, are mixed with 46 g of hexahydrophthalic anhydride at 65°C and cured in an aluminum mould over the course of 2 hours at 80°C + 15 hours at 140°C. The castings thus obtained have the following mechanical properties:

| | |
|---|---|
| Flexural strength, VSM 77,103 | = 12.0 kp/mm² |
| Deflection, VSM 77,103 | = 18.0 mm |
| Impact strength, VSM 77,105 | = 25 cmkg/cm² |
| Tensile strength, VSM 77,101 | = 6.7 kp/mm² |
| Elongation at break, VSM 77,101 | = 4.4 % |
| Cold water absorption, 4 days at 20°C | = 0.57 % |

The following comparison tests show that certain mechanical properties, especially the impact strength, of the casting obtained by curing the epoxide resin according to Example VI are better than those of the castings obtained by executing Example (a) of the U.S. Pat. No. 3,629,263, Example III(b) of the U.S. Pat. No. 3,640,910, and Example II, sample 3, of the U.S. Pat. No. 3,542,803 (c):

a. A mixture of 32.5 g of
a. A mixture of 32.5 g of 1,3-di-($\beta$-hydroxyethyl)-5,5-dimethylhydantoin (0.15 mol), 167.0 g of epichlorhydrin (1.8 mols) and 0.746 g of tetraethylammonium chloride is stirred for 1.5 hours at 90°C and a circulatory distillation is then started at 60°C. 31.20 g of 50% strength aqueous sodium hydroxide solution (0.38 mol) are added dropwise over the course of 2 hours with good stirring and at the same time the water present in the reaction mixture is continuously separated off. The reaction mixture is now separated from the resulting sodium chloride by filtration and is washed with 30 ml of water. After separating off the aqueous layer, the mixture is concentrated at 60°C/20 mm Hg. Thereafter it is dried at 60°C and 0.2 mm Hg, to remove the last traces of volatile constituents, until constant weight is reached. The diglycidyl ether of 1,3-di-($\beta$-hydroxyethyl)-5,5-dimethylhydantoin, containing 6.08 epoxide equivalents/kg (100% of theory) is obtained in 97.1% yield (48.0 g); the total chlorine content is less than 0.7%.

A mixture of 180 g of the 1,3-di-($\beta$-glycidyloxyethyl)-5,5-dimethylhydantoin (epoxide content 5.56 equivalents/kg) and 131 g of hexahydrophthalic anhydride is processed at 40°C to give a homogeneous, clear, pale yellow and very mobile mixture. This mixture is poured into aluminium moulds pre-warmed to 80°C. Curing is carried out in 2 hours at 80°C + 2 hours at 120°C + 15 hours at 150°C. The pale yellow, clear, transparent mouldings thus obtained show the following properties:

| | |
|---|---|
| Flexural strength (VSM 77,103) | = 14.3 kp/mm$^2$ |
| Deflection (VSM 77,103) | = 12.7 mm |
| Impact strength (VSM 77,105) | = 13.7 cmkp/cm$^2$ |
| Heat distortion point according to Martens (DIN 53,458) | = 75°C |
| Water absorption (4 days/20°C) | = 0.68 % |
| Breakdown voltage (VDE 0303) | = 226 kv/cm |
| Tracking resistance (VDE 0303), level | KA3c |
| Arcing resistance (VDE 0303), level | L4 |
| Specific resistance (VDE 0303), 20°C | = 6.10$^{16}$ Ω.cm |
| Dielectric constant (DIN 53,483), 20°C | = 3.60 |
| Dielectric loss factor tg δ (50 Hz) DIN 53,483, 20°C | = 0.006 | b. A mixture of 431 parts of bis(6-methyl-3,4-epoxy-cyclohexyl-methyl)adipate (liquid, epoxide content of 4,6 equivalents/kg), 64 parts of 5,5-dimethylhydantoin (corresponding to a ratio of epoxide groups : NH groups : 2 : 1) and 0.2 parts by volume of 30 % strength aqueous sodium hydroxide solution is stirred for 2 hours and 20 minutes at 170°C. After this reaction time the melt is poured into a metal sheet in order to cool. The resulting solid (so-called) "advanced" epoxide resin has an epoxide content of 1,97 epoxide equivalents/kg (theory: 2.02). 118 parts of this epoxide resin are fused together with 33 parts of hexahydrophthalic anhydride at about 100°C, cast into prewarmed aluminium moulds and cured for 4 hours at 80°C and then for 10 hours at 140°C. Casting having the following properties are obtained:

| | |
|---|---|
| Flexural strength (VSM) | = 10.4 kg/mm$^2$ |
| Deflection at break | = 7.1 mm |
| Impact strength (VSM) | = 6.7 cmkg/cm$^2$ |
| Heat distortion point according to Martens (DIN) | = 73°C |
| Boiling water uptake after 1 hour | = 1.3°C |
| Tracking resistance (VDE), level | KA3c |
| Arcing resistance (VDE), level | L4 |
| Dielectric loss factor tg δ (20°C, 50 cycles/second) | = 0.006 |
| Dielectric constant at 20°C | = 3.4 |
| Specific resistance at 20°C | = 6.5 × 10$^{16}$ Ω.cm. | c. 100 parts of 1,12-bis(N-glycidyl-5,5-dimethyl-hydantoinyl-3)-dodecane (manufactured according to the comparison test example after Example III) are mixed with 48,2 parts hexahydrophthalic anhydride, cast into pre-warmed aluminium moulds, and cured during 16 hours at 80°C and then during 12 hours at 120°C. Castings having the following properties are obtained:

| | |
|---|---|
| Flexural strength | = 9.4 kg/mm$^2$ |
| Deflection | = 14.4 mm |
| Impact strength | = 14.7 cmkg/cm$^2$ |
| Heat distortion point according to Martens (DIN) | = 62°C |
| Water absorption (4 days at room temperature) | = 0.35 %. |

EXAMPLE VII 69.7 g of the epoxide resin manufactured according to Example 2 (3.0 epoxide equivalents/kg) are mixed with 30.2 g of hexahydrophthalic anhydride at 60°C, and this mixture is cured over the course of 3 hours at 80°C + 12 hours at 150°C. The mouldings thus obtained show the following mechanical properties:

| | | |
|---|---|---|
| Flexural strength, VSM 77,103 | = | 13-15 kp/mm$^2$ |
| Deflection, VSM 77,103 | = | 8-10 mm |
| Impact strength, VSM 77,105 | = | 10-12 cmkp/cm$^2$ |
| Cold water absorption, 4 days at 20°C | = | 0.49% |

EXAMPLE VIII 80 parts of the epoxide resin manufactured according to Example 1, containing 3.06 epoxide equivalents/kg, are mixed with 20 parts of 1,4-butanediol-diglycidyl-ether as a reactive diluent, 70 parts of hexahydrophthalic anhydride and 1 part of the curing accelerator benzyldimethylamine, at 80°C, and the mixture is poured into casting moulds made of aluminium and pre-warmed to 80°C. The mixture is first allowed to gel at 80°C over the course of 4 hours, and is then fully cured over the course of 10 hours at 120°C. The resulting mouldings possess the following mechanical properties:

| | | |
|---|---|---|
| Flexural strength (VSM 77,103) | = | 10-15 kp/mm$^2$ |
| Deflection (VSM 77,103) | = | 12-17 mm |
| Impact strength (VSM 77,105) | = | 25-35 cmkp/cm$^2$ |
| Heat distortion point according to Martens (DIN) | = | 61 °C |
| Cold water absorption (4 days at 20°C) | = | 0.4 - 0.5% |

EXAMPLE IX 95.2 g of the epoxide resin manufactured according to Example 7, containing 3.07 epoxide equivalents/kg, are stirred at 70°C with 43.8 g of hexahydrophthalic anhydride and with 2 g of an accelerator consisting of benzyltrimethylamine and sodium hexylate, and the mixture is poured into aluminium moulds of 4 mm wall thickness, pre-warmed to 80°C. The mixture is fully cured over the course of 2 hours/80°C + 2 hours/120°C + 12 hours/150°C, and clear, transparent, pale yellow mouldings having the following properties are obtained:

| | |
|---|---|
| Flexural strength (VSM 77,103) | 11.7 kp/mm² |
| Deflection (VSM 77,103) | 8.6 mm |
| Impact strength (VSM 77,105) | 17.6–21.3 cmkp/cm² |
| Heat distortion (DIN 53,461) | 68°C |
| Heat distortion point according to Martens (DIN) | 63°C |

EXAMPLE X 98.1 g of the epoxide resin manufactured according to Example 6, containing 2.9 epoxide equivalents/kg, are mixed in accordance with Example IX with 43.8 g of hexahydrophthalic anhydride and 1 g of the accelerator used in Example IX, and the mixture is processed and cured. Mouldings having the following properties are obtained:

| | |
|---|---|
| Flexural strength (VSM 77,103) | 10.74 kp/mm² |
| Deflection (VSM 77,103) | 5.1 mm |
| Impact strength (VSM 77,105) | 12.1–13.6 cmkp/cm² |
| Water absorption (4 days, 120°C) | 0.77% |
| Heat distortion point according to Martens (DIN) | 82°C |
| Heat distortion (DIN 53,461) | 85–92°C |

EXAMPLE XI

100 Parts of the epoxide resin produced according to Example 10 are stirred together with 47 parts of hexahydrophthalic acid anhydride, 5 parts of butanediol-diglycidyl ether and 1.5 parts of methylimidazole at 80° to form a clear homogeneous melt; this is cured in aluminium moulds for 4 hours at 80°C + 12 hours at 120°C. The thus obtained moulded specimens possess the following properties:

| | |
|---|---|
| Flexural strength (VSM 77103) | 12.5 kp/mm² |
| Deflection (VSM 77103) | 6.4 mm |
| Impact bend strength (VSM 77105) | 19.1 cm.kp/cm² |
| Dimensional stability at elevated temperature according to Martens (DIN 53458) | 64°C |
| Boiling water absorption (1ʰ/100°C) | 0.9 % |

EXAMPLE XII

100 Parts of the epoxide resin produced according to Example 11 are mixed with 50 parts of hexahydrophthalic acid anhydride and 1.5 parts of methylimidazole, and the melt is then cured in the manner described in Example XI. Moulded shapes are obtained possessing the following good mechanical properties:

| | |
|---|---|
| Flexural strength (VSM 77103): | 14.6 kp/mm² |
| Deflection (VSM 77103): | 12.0 mm |
| Impact bend strength (VSM 77105): | 20–28 cm.kp/cm² |
| Dimensional stability at elevated temperature according to Martens (DIN 53548): | 85–87°C |
| Glass transition temperature | 105°C |
| Water absorption (4 days/20°C): | 0.60 % |
| Boiling water absorption (1 hour/100°C): | 0.93 % |

EXAMPLE XIII

100 Parts of the epoxide resin produced according to Example 12 are worked up with 50 parts of hexahydrophthalic acid anhydride, at a temperature of 120°C, to form a homogeneous colourless melt. This is cooled to 50°C, and cured in aluminium moulds for 4 hours at 80°C + 16 hours at 140°C. Mouldings are obtained possessing the following properties:

| | |
|---|---|
| Dimensional stability at elevated temperature according to Martens DIN 53458: | 127°C |
| Impact bend strength (VSM 77105): | 16–18 cm.kp/cm² |
| Deflection (VSM 77103): | 6 mm |
| Flexural strength (VSM 77103): | 15 kp/mm² |
| Boiling water absorption 1 hour/100°C: | 0.61 % |

EXAMPLE XIV

100 Parts of the diepoxide produced according to Example 15 are cured with 45 parts of hexahydrophthalic acid anhydride and 3 parts of methylimidazole in 4 hours at 80°C + 16 hours at 140°C. The mouldings exhibit a dimensional stability at elevated temperature according to Martens (DIN 53458) of 75°C, and absorb during 4 days storage in water (20°C) only 0.53% of water.

EXAMPLE XV

100 Parts of the epoxide resin produced according to Example 14 are processed with the same curing agent — accelerator amounts, and under the same conditions, as described in Example XIV. Mouldings are thus obtained exhibiting a dimensional stability at elevated temperature according to Martens (DIN SB 458) of 87°C, with a water absorption of only 0.47% (4 days/20°C).

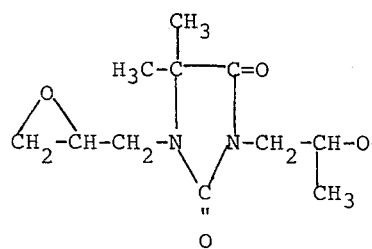 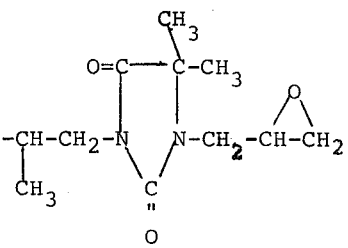
7. A compound according to claim 1 of the formula
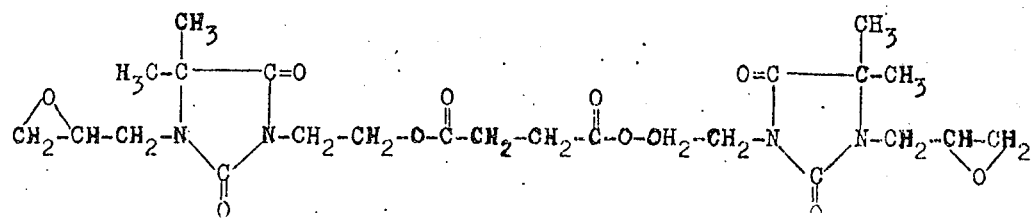

We claim:

1. A binuclear N-heterocyclic N,N'-diglycidyl compound of the formula

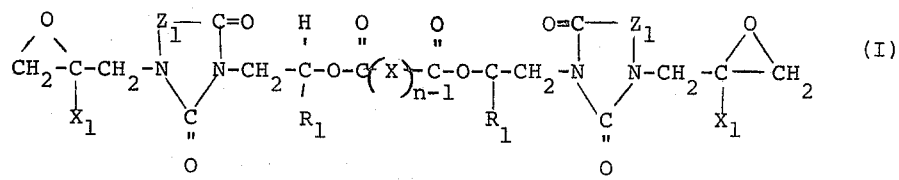

wherein $X_1$ is hydrogen or methyl, $R_1$ is hydrogen, methyl, ethyl, or phenyl, X is alkylene of 1 to 4 carbon atoms, cyclohexylene, or phenylene, $Z_1$ is

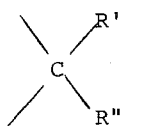 or 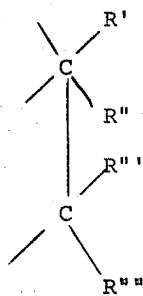

wherein R', R'', R''' and R'''' independently of one another are hydrogen, alkyl of 1 to 4 carbon atoms or R' and R'' together are pentamethylene and n is 1 or 2.

2. A compound as defined in claim 1, wherein X represents an alkylene of 2 to 8 carbon atoms, cyclohexylene or phenylene.

3. A compound according to claim 1, of the formula

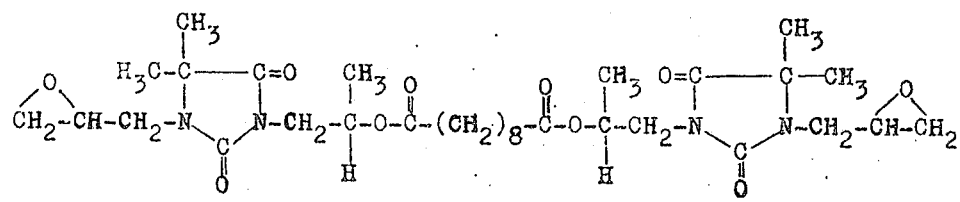

4. A compound according to claim 1, of the formula

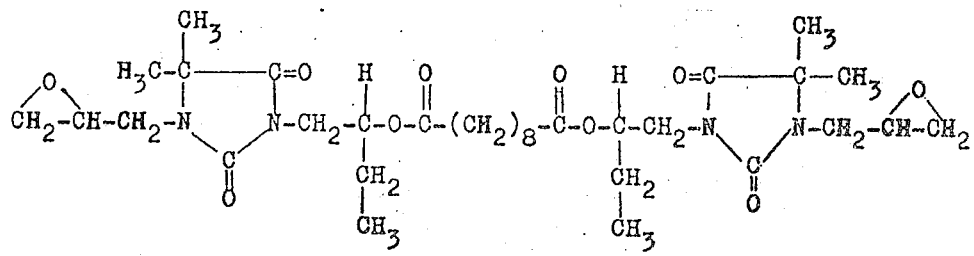

5. A compound according to claim 1 of the formula

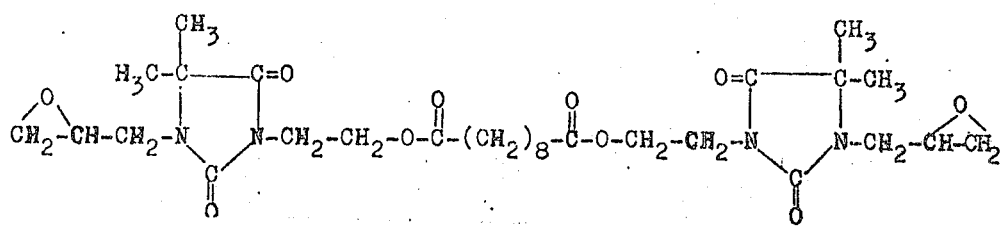

6. A compound according to claim 1 of the formula